US011820162B2

(12) United States Patent
Shirokane et al.

(10) Patent No.: US 11,820,162 B2
(45) Date of Patent: Nov. 21, 2023

(54) PRETREATMENT LIQUID, INK SET, BASE MATERIAL FOR IMAGE RECORDING, METHOD OF PRODUCING BASE MATERIAL FOR IMAGE RECORDING, IMAGE RECORDING MATERIAL, AND IMAGE RECORDING METHOD

(71) Applicant: FUJIFILM Corporation, Tokyo (JP)

(72) Inventors: Kenji Shirokane, Kanagawa (JP); Shoichiro Kobayashi, Kanagawa (JP); Yusuke Fujii, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 444 days.

(21) Appl. No.: 17/204,911

(22) Filed: Mar. 17, 2021

(65) Prior Publication Data

US 2021/0197606 A1 Jul. 1, 2021

Related U.S. Application Data

(63) Continuation of application No. PCT/JP2019/034033, filed on Aug. 30, 2019.

(30) Foreign Application Priority Data

Sep. 26, 2018 (JP) ................................ 2018-180921

(51) Int. Cl.

| | |
|---|---|
| ***B41M 5/00*** | (2006.01) |
| ***C08K 5/092*** | (2006.01) |
| ***C09D 133/06*** | (2006.01) |
| ***C09D 133/26*** | (2006.01) |

(52) U.S. Cl.

CPC ........ *B41M 5/0017* (2013.01); *B41M 5/0047* (2013.01); *B41M 5/0064* (2013.01); *C08K 5/092* (2013.01); *C09D 133/066* (2013.01); *C09D 133/26* (2013.01)

(58) Field of Classification Search

CPC ...... B41J 2/01; B41J 11/0015; B41M 5/0017; B41M 5/0047; B41M 5/0064; C09D 11/30; C09D 11/54; C09D 133/066; C09D 133/26; C08F 220/1804; C08F 220/1808; C08F 220/20; C08F 220/585; C08F 212/08; C08K 5/092

See application file for complete search history.

(56) References Cited

U.S. PATENT DOCUMENTS

| | | | | |
|---|---|---|---|---|
| 2010/0196604 | A1 | 8/2010 | Kariya et al. | |
| 2012/0320123 | A1 * | 12/2012 | Takeda .................. | C09D 11/40 524/320 |
| 2016/0312061 | A1 | 10/2016 | Aoai | |
| 2017/0355868 | A1 | 12/2017 | Saiga et al. | |
| 2018/0257104 | A1 | 9/2018 | Che et al. | |
| 2019/0010349 | A1 | 1/2019 | Shimono et al. | |

FOREIGN PATENT DOCUMENTS

| | | |
|---|---|---|
| CN | 102827506 | 12/2012 |
| EP | 3263662 | 1/2018 |
| JP | 2010023266 | 2/2010 |
| JP | 2013001854 | 1/2013 |
| JP | 2016204524 | 12/2016 |
| JP | 2017013349 | 1/2017 |
| JP | 2017013350 | 1/2017 |
| JP | 2017222833 | 12/2017 |
| WO | 2017013984 | 1/2017 |
| WO | 2017163738 | 9/2017 |

OTHER PUBLICATIONS

"International Search Report (Form PCT/ISA/210) of PCT/JP2019/034033," dated Oct. 1, 2019, with English translation thereof, pp. 1-5.

(Continued)

*Primary Examiner* — Anh T Vo
(74) *Attorney, Agent, or Firm* — JCIPRNET

(57) ABSTRACT

A pretreatment liquid is a pretreatment liquid to be used for a pretreatment that is performed on an impermeable base material before an image is recorded on the impermeable base material, containing an aggregating agent, an aqueous medium, and a resin, in which the resin has at least one selected from the group consisting of a structural unit (1), a structural unit (2), and a structural unit (3), and a glass transition temperature of the resin is −40° C. or higher and lower than 100° C. In the formulae, $R^2$ represents a hydrogen atom or a C1 to C4 alkyl group, $A^2$ represents —NH— or —N($L^4$-$Y^4$)—, $L^2$ and $L^4$ represent a divalent group or a single bond, $L^3$ represents a divalent group, $Y^2$ and $Y^4$ represent a monovalent group such as an alkyl group, and $Y^3$ represents a monovalent group such as —OH.

(1)

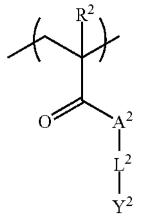

(2)

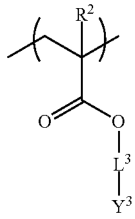

(3)

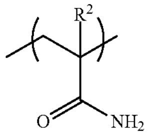

17 Claims, No Drawings

(56) References Cited

OTHER PUBLICATIONS

"Written Opinion of the International Searching Authority (Form PCT/ISA/237) of PCT/JP2019/034033," dated Oct. 1, 2019, with English translation thereof, pp. 1-17.
"Search Report of Europe Counterpart Application", dated Dec. 20, 2021, p. 1-p. 11.
Office Action of China Counterpart Application, with English translation thereof, dated Jan. 4, 2022, pp. 1-23.
Office Action of Japan Counterpart Application, with English translation thereof, dated Nov. 2, 2021, pp. 1-9.

* cited by examiner

PRETREATMENT LIQUID, INK SET, BASE MATERIAL FOR IMAGE RECORDING, METHOD OF PRODUCING BASE MATERIAL FOR IMAGE RECORDING, IMAGE RECORDING MATERIAL, AND IMAGE RECORDING METHOD

CROSS-REFERENCE TO RELATED APPLICATIONS

This application is a Continuation of PCT International Application No. PCT/JP2019/034033 filed on Aug. 30, 2019, which claims priority under 35 U.S.C § 119(a) to Japanese Patent Application No. 2018-180921 filed on Sep. 26, 2018. Each of the above application(s) is hereby expressly incorporated by reference, in its entirety, into the present application.

BACKGROUND OF THE INVENTION

1. Field of the Invention

The present disclosure relates to a pretreatment liquid, an ink set, a base material for image recording, a method of producing a base material for image recording, an image recording material, and an image recording method.

2. Description of the Related Art

In the related art, various examinations have been conducted on image recording carried out using an ink and a treatment liquid.

For example, WO2017/163738A discloses, as an ink set capable of obtaining a solid image area having a desired concentration and suppressing occurrence of streak-like unevenness, an ink set which includes an ink containing a colorant and water, and a treatment liquid. This treatment liquid contains particles of a water-insoluble resin having a constitutional unit derived from a first monomer containing at least one group selected from a sulfo group or a salt of the sulfo group, and a constitutional unit derived from a second monomer having at least one structure selected from an aromatic ring structure or an alicyclic structure; a compound that allows the colorant in the ink to be aggregated; and water.

Further, JP2017-013350A discloses, as a recording method that enables provision of a recording material with a high glossiness, a recording method including: a first drying step of coating a recording medium with a pretreatment liquid and drying the pretreatment liquid at a drying temperature T; a second drying step of attaching an ink to the recording medium coated with the pretreatment liquid and drying the ink at a drying temperature T2; and a third drying step of coating the recording medium, to which the ink has been attached, with a post-treatment liquid and drying the post-treatment liquid at a drying temperature T3, in which the pretreatment liquid contains a resin having a glass transition temperature Tg1, the ink contains a resin having a glass transition temperature Tg2, and the post-treatment liquid contains a resin having a glass transition temperature Tg3, and Expressions (1) and (2) are satisfied.

$$Tg1<Tg2<Tg3 \quad (1)$$

$$T1<T2<T3 \quad (2)$$

SUMMARY OF THE INVENTION

In a case where the techniques described in WO2017/163738A and JP2017-013350A are employed for image recording, which is carried out by applying a pretreatment liquid onto an impermeable base material to record an image on the surface of the impermeable base material onto which the pretreatment liquid has been applied, further improvement of the adhesiveness of the image to the impermeable base material may be required.

The present disclosure has been made in consideration of the above-described circumstances.

An object according to a first aspect of the present disclosure is to provide a pretreatment liquid which is used for a pretreatment performed on an impermeable base material before an image is recorded on the impermeable base material, and is capable of improving the adhesiveness of an image to the impermeable base material.

An object according to a second aspect of the present disclosure is to provide an ink set which is capable of recording an image with excellent adhesiveness to an impermeable base material.

An object according to a third aspect of the present disclosure is to provide a base material for image recording, which is capable of recording an image with excellent adhesiveness.

An object according to a fourth aspect of the present disclosure is to provide a method of producing a base material for image recording, which enables production of the base material for image recording described above.

An object according to a fifth aspect of the present disclosure is to provide an image recording material comprising an impermeable base material and an image with excellent adhesiveness to the impermeable base material.

An object according to a sixth aspect of the present disclosure is to provide an image recording method which enables recording of an image with excellent adhesiveness to an impermeable base material.

Specific means for achieving the above-described objects includes the following aspects.

<1> A pretreatment liquid to be used for a pretreatment that is performed on an impermeable base material before an image is recorded on the impermeable base material, the pretreatment liquid comprising: an aggregating agent; a resin; and an aqueous medium, in which the resin has at least one selected from the group consisting of a structural unit (1), a structural unit (2), and a structural unit (3), and a glass transition temperature of the resin is −40° C. or higher and lower than 100° C.

(1)

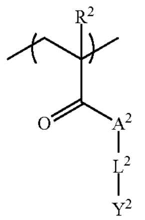

(2)

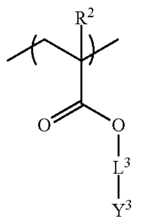

-continued (3)

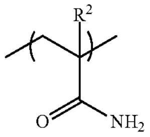

In the structural unit (1), the structural unit (2), and the structural unit (3), $R^2$ represents a hydrogen atom or an alkyl group having 1 to 4 carbon atoms.

In the structural unit (1), $A^2$ represents —NH— or —N($L^4$-$Y^4$)—, $L^2$ represents a divalent group which is one selected from the first group consisting of an alkylene group, an alkenylene group, an alkynylene group, an arylene group, —O—, —NH—, —N($L^4$-$Y^4$)—, and —C(═O)—, a divalent group which is obtained by combining two or more selected from the first group, or a single bond, $Y^2$ represents an alkyl group, an alkenyl group, an alkynyl group, an aryl group, a halogen atom, —OH, —$OR^3$, —$NH_2$, —$NR^3H$, —$NR^3R^4$, or —C(═O)$R^3$, and two of $A^2$, $L^2$, and $Y^2$ may be linked to each other to form a ring.

In the structural unit (2), $L^3$ represents a divalent group which is one selected from the first group or a divalent group which is obtained by combining two or more selected from the first group, $Y^3$ represents a halogen atom, —OH, —$NH_2$, —$NR^3H$, —$NR^3R^4$, or —C(═O)$R^3$, and L and $Y^3$ may be linked to each other to form a ring.

In the structural unit (1) and the structural unit (2), $L^4$ represents a divalent group which is one selected from the second group consisting of an alkylene group, an alkenylene group, an alkynylene group, an arylene group, —O—, —NH—, and —C(═O)—, a divalent group which is obtained by combining two or more selected from the second group, or a single bond, $Y^4$ represents an alkyl group, an alkenyl group, an alkynyl group, an aryl group, a halogen atom, —OH, —$OR^3$, —$NH_2$, —$NR^3H$, —$NR^3R^4$, or —C(═O)$R^3$, and $R^3$ and $R^4$ each independently represent an alkyl group, an alkenyl group, an alkynyl group, or an aryl group.

In the structural unit (1) and the structural unit (2), $L^4$ and $Y^4$ in —N($L^4$-$Y^4$)— may be linked to each other to form a ring, and $R^3$ and $R^4$ in —$NR^3R^4$ may be linked to each other to form a ring.

<2> The pretreatment liquid according to <1>, in which the resin further has at least one selected from the group consisting of a structural unit (A), a structural unit (B), a structural unit (C), a structural unit (D), a structural unit (E), and a structural unit (F).

(A)

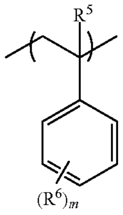

(B)

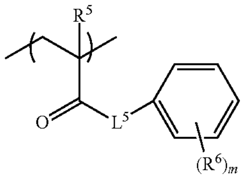

-continued (C)

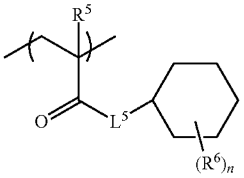

(D)

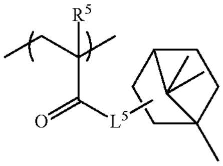

(E)

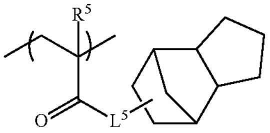

(F)

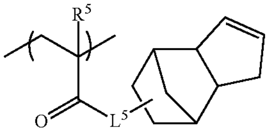

In the structural unit (A), the structural unit (B), the structural unit (C), the structural unit (D), the structural unit (E), and the structural unit (F), $R^5$ represents a hydrogen atom or a methyl group, $R^6$ represents an alkyl group, an alkenyl group, or an alkynyl group, m represents an integer of 0 to 5, n represents an integer of 0 to 11, and $L^5$ represents a divalent group which is one selected from the third group consisting of an alkylene group having 1 to 18 carbon atoms, an arylene group having 6 to 18 carbon atoms, —O—, —NH—, —S—, and —C(═O)—, a divalent group which is obtained by combining two or more selected from the third group, or a single bond.

<3> The pretreatment liquid according to <2>, in which the resin has at least one selected from the group consisting of the structural unit (A) and the structural unit (B).

<4> The pretreatment liquid according to any one of <1> to <3>, in which a total content of the structural unit (1), the structural unit (2), and the structural unit (3) is in a range of 5% by mass to 80% by mass with respect to an entirety of the resin.

<5> The pretreatment liquid according to any one of <1> to <4>, in which a total content of the structural unit (1), the structural unit (2), and the structural unit (3) is in a range of 10% by mass to 60% by mass with respect to an entirety of the resin.

<6> The pretreatment liquid according to any one of <1> to <5>, in which the resin has at least one selected from the group consisting of the structural unit (1) and the structural unit (2).

<7> The pretreatment liquid according to any one of <1> to <6>, in which the glass transition temperature of the resin is in a range of −20° C. to 90° C.

<8> The pretreatment liquid according to any one of <1> to <7>, in which the glass transition temperature of the resin is in a range of −10° C. to 60° C.

<9> The pretreatment liquid according to any one of <1> to <8>, in which the resin further has a structural unit (4).

(4)

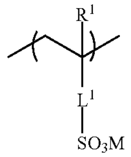

In the structural unit (4), R represents a methyl group or a hydrogen atom, $L^1$ represents a divalent group which is one selected from the fourth group consisting of an alkylene group having 1 to 10 carbon atoms, an arylene group having 6 to 10 carbon atoms, —O—, —NH—, —S—, —C(═O)—, and —CH(—OH)—, a divalent group which is obtained by combining two or more selected from the fourth group, or a single bond, and M represents a hydrogen atom or a cation.

<10> The pretreatment liquid according to any one of <1> to <9>, in which a content of a structural unit derived from an alkyl (meth)acrylate containing a chain alkyl group having 2 or more carbon atoms in the resin is less than 5% by mass with respect to an entirety of the resin.

<11> The pretreatment liquid according to any one of <1> to <10>, in which a distance between Hansen solubility parameters of the resin and the aqueous medium is in a range of 33 $MPa^{1/2}$ to 40 $MPa^{1/2}$.

<12> The pretreatment liquid according to any one of <1> to <11>, in which a content mass ratio of the resin to the aggregating agent is in a range of 1.0 to 10.

<13> The pretreatment liquid according to any one of <1> to <12>, in which a distance between Hansen solubility parameters of the resin and the aggregating agent is in a range of 5 $MPa^{1/2}$ to 28 $MPa^{1/2}$.

<14> An ink set used for recording an image on an impermeable base material, comprising: the pretreatment liquid according to any one of <1> to <13>; and an ink containing water and a colorant.

<15> Abase material for image recording, comprising: an impermeable base material; and a pretreatment layer which is disposed on at least one surface of the impermeable base material and contains a solid content of the pretreatment liquid according to any one of <1> to <13>.

<16> A method of producing a base material for image recording, comprising: a step of applying the pretreatment liquid according to any one of <1> to <13> onto an impermeable base material.

<17> An image recording material comprising: an impermeable base material; and an image which is disposed on at least one surface of the impermeable base material and contains a solid content of the pretreatment liquid according to any one of <1> to <13> and a colorant.

<18> An image recording method comprising: a step of applying the pretreatment liquid according to any one of <1> to <13> onto an impermeable base material; and a step of applying an ink containing water and a colorant onto a surface of the impermeable base material onto which the pretreatment liquid has been applied to record an image.

According to the first aspect of the present disclosure, it is possible to provide a pretreatment liquid which is used for a pretreatment performed on an impermeable base material before an image is recorded on the impermeable base material and is capable of improving the adhesiveness of an image to the impermeable base material.

According to the second aspect of the present disclosure, it is possible to provide an ink set which is capable of recording an image with excellent adhesiveness to an impermeable base material.

According to the third aspect of the present disclosure, it is possible to provide a base material for image recording, which is capable of recording an image with excellent adhesiveness.

According to the fourth aspect of the present disclosure, it is possible to provide a method of producing a base material for image recording, which enables production of the base material for image recording described above.

According to the fifth aspect of the present disclosure, it is possible to provide an image recording material comprising an impermeable base material and an image with excellent adhesiveness to the impermeable base material.

According to the sixth aspect of the present disclosure, it is possible to provide an image recording method which enables recording of an image with excellent adhesiveness to an impermeable base material, on an impermeable base material.

DESCRIPTION OF THE PREFERRED EMBODIMENTS

In the present disclosure, the numerical ranges shown using "to" indicate ranges including the numerical values described before and after "to" as the lower limits and the upper limits.

In the present disclosure, in a case where a plurality of substances corresponding to respective components in a composition are present, the amount of the respective components in the composition indicates the total amount of the plurality of substances present in the composition unless otherwise specified.

In a numerical range described in a stepwise manner in the present specification, an upper limit or a lower limit described in a certain numerical range may be replaced with an upper limit or a lower limit in another numerical range described in a stepwise manner or may be replaced with a value described in an example.

In the present disclosure, the meaning of the term "step" includes not only an independent step but also a step whose intended purpose is achieved even in a case where the step is not clearly distinguished from other steps.

In the present disclosure, a combination of two or more preferable aspects is a more preferable aspect.

In the present disclosure, the concept of "(meth)acryl" includes both acryl and methacryl, the concept of "(meth) acrylate" includes both acrylate and methacrylate, and the concept "(meth)acryloyl" includes both acryloyl and methacryloyl.

In the present disclosure, "*" in a chemical formula represents a bonding position.

[Pretreatment Liquid]

The pretreatment liquid according to the embodiment of the present disclosure is a pretreatment liquid to be used for a pretreatment that is performed on an impermeable base material before an image is recorded on the impermeable base material, the pretreatment liquid containing an aggregating agent, a resin, and an aqueous medium, in which the resin has at least one selected from the group consisting of the following structural unit (1), the following structural unit (2), and the following structural unit (3), and the glass transition temperature of the resin is −40° C. or higher and lower than 100° C.

In the present disclosure, the above-described resin will also be referred to as a specific resin.

(1)

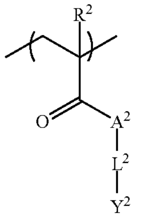

(2)

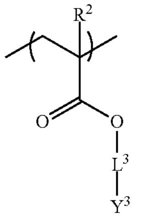

(3)

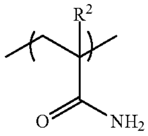

In the structural units (1) to (3), $R^2$ represents a hydrogen atom or an alkyl group having 1 to 4 carbon atoms.

In the structural unit (1), $A^2$ represents —NH— or —N($L^4$-$Y^4$)—, $L^2$ represents a divalent group which is one selected from the first group consisting of an alkylene group, an alkenylene group, an alkynylene group, an arylene group, —O—, —NH—, —N($L^4$-$Y^4$)—, and —C(═O)—, a divalent group which is obtained by combining two or more selected from the first group, or a single bond, $Y^2$ represents an alkyl group, an alkenyl group, an alkynyl group, an aryl group, a halogen atom, —OH, —$OR^3$, —$NH_2$, —$NR^3H$, —$NR^3R^4$, or —C(═O)$R^3$, and two of $A^2$, $L^2$, and $Y^2$ may be linked to each other to form a ring.

In the structural unit (2), $L^3$ represents a divalent group which is one selected from the first group or a divalent group which is obtained by combining two or more selected from the first group, $Y^3$ represents a halogen atom, —OH, —$OR^3$, —$NH_2$, —$NR^3H$, —$NR^3R^4$, or —C(═O)$R^3$, and $L^3$ and $Y^3$ may be linked to each other to form a ring.

In the structural unit (1) and the structural unit (2), $L^4$ represents a divalent group which is one selected from the second group consisting of an alkylene group, an alkenylene group, an alkynylene group, an arylene group, —O—, —NH—, and —C(═O)—, a divalent group which is obtained by combining two or more selected from the second group, or a single bond, $Y^4$ represents an alkyl group, an alkenyl group, an alkynyl group, an aryl group, a halogen atom, —OH, —$OR^3$, —$NH_2$, —$NR^3H$, —$NR^3R^4$, or —C(═O)$R^3$, and $R^3$ and $R^4$ each independently represent an alkyl group, an alkenyl group, an alkynyl group, or an aryl group.

In the structural unit (1) and the structural unit (2), $L^4$ and $Y^4$ in —N($L^4$-$Y^4$)— may be linked to each other to form a ring, and $R^3$ and $R^4$ in —$NR^3R^4$ may be linked to each other to form a ring.

In the present disclosure, for example, a plurality of $L^4$'s may be present in the structural unit (1). In this case, the plurality of $L^4$'s may be the same as or different from each other. The same applies to other groups (for example, $Y^4$).

The same applies to other structural units.

As described above, the pretreatment liquid according to the embodiment of the present disclosure is a pretreatment liquid to be used for a pretreatment that is performed on an impermeable base material before an image is recorded on the impermeable base material.

That is, the pretreatment liquid according to the embodiment of the present disclosure is used as the pretreatment liquid in image recording which is carried out by applying a pretreatment liquid containing an aggregating agent, a resin, and an aqueous medium onto an impermeable base material and applying an ink onto the surface of the impermeable base material onto which the pretreatment liquid has been applied, to record an image.

In the image recording described above, components (a colorant and the like) in the ink applied onto the impermeable base material are aggregated by the action of the aggregating agent, and thus an image is recorded. In this manner, a high-definition image is recorded. Further, the inclusion of the aggregating agent in the pretreatment liquid also contributes to increasing the speed of image recording.

Further, the resin in the pretreatment liquid is a component intended to ensure the adhesiveness of the image to the impermeable base material.

In the present disclosure, the "image" indicates a film obtained by combining a layer derived from the pretreatment liquid (hereinafter, also referred to as a "pretreatment layer") with a layer derived from the ink (hereinafter, also referred to as an "ink layer"). The pretreatment layer is disposed between the impermeable base material and the ink layer.

Here, the interface between the ink layer and the pretreatment layer does not necessarily have to be clear.

For example, the composition of the image (film) may change continuously in the layer thickness direction.

According to the pretreatment liquid according to the embodiment of the present disclosure, the adhesiveness of the image to the impermeable base material in the image recording described above can be improved.

The reason why such effects are exhibited is not clear, but is assumed as follows.

Based on the examination conducted by the present inventors, it was found that the adhesiveness of the image to the impermeable base material may be insufficient in the image recording described above.

The reason why the adhesiveness is insufficient is not clear, but a decrease in film hardness of the recorded image due to crystallization of the aggregating agent in the image (that is, in the pretreatment layer and/or in the ink layer) is considered as one factor.

In the pretreatment liquid according to the embodiment of the present disclosure, it is considered that the crystallization of the aggregating agent is suppressed and thus the problem of insufficient adhesiveness of the image to the impermeable base material is solved (that is, the adhesiveness is improved) due to the combination of an effect that the specific resin contained in the pretreatment liquid has at least one (hereinafter, also referred to as a "specific hydrophilic structural unit") selected from the group consisting of the structural unit (1), the structural unit (2), and the structural unit (3) which are hydrophilic structural units with an effect that the glass transition temperature of the specific resin is −40° C. or higher and lower than 100° C.

<Impermeable Base Material>

The pretreatment liquid according to the embodiment of the present disclosure is used for the pretreatment performed on the impermeable base material in image recording on the impermeable base material.

In the present disclosure, the impermeability in the impermeable base material indicates a property that the water absorption rate in 24 hours which is measured in conformity with ASTM D570 is 2.5% or less.

Here, the unit "%" of the water absorption rate is on a mass basis.

The water absorption rate is preferably 1.0% or less and more preferably 0.5% or less.

Examples of the material of the impermeable base material include glass, a metal (such as aluminum, zinc, or copper), and a resin (such as a polyvinyl chloride resin, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinyl acetal, nylon, or an acrylic resin).

It is suitable that the shape of the impermeable base material is a sheet (film) or a plate.

Examples of the impermeable base material having such a shape include a glass plate, a metal plate, a resin sheet (resin film), paper on which plastic is laminated, paper on which a metal is laminated or vapor-deposited, and a plastic sheet (plastic film) on which a metal is laminated or vapor-deposited.

Further, the thickness of the impermeable base material is preferably in a range of 0.1 μm to 1000 μm, more preferably in a range of 0.1 μm to 800 μm, and still more preferably in a range of 1 μm to 500 μm.

A resin is preferable as the material of the impermeable base material.

Examples of the resin are as described above, but polypropylene, polyethylene, polyethylene terephthalate, nylon, an acrylic resin, or a polyvinyl chloride resin is preferable from the viewpoint of versatility.

Examples of the impermeable base material made of a resin include a resin sheet (resin film), and more specific examples thereof include a flexible packaging material for packaging food or the like and a panel for guiding the floor of a mass retailer.

Examples of the impermeable base material include a textile (woven fabric) or non-woven fabric formed of impermeable fibers in addition to a sheet-like (film-like) or plate-like impermeable base material.

The impermeable base material may be subjected to a hydrophilization treatment.

Examples of the hydrophilization treatment include a corona treatment, a plasma treatment, a heat treatment, an abrasion treatment, a light irradiation treatment (such as a UV treatment), and a flame treatment, but the present invention is not limited thereto.

The corona treatment can be performed using Corona Master (manufactured by Shinko Electric & Instrumentation Co., Ltd., PS-10S) or the like. The conditions for the corona treatment may be appropriately selected according to the kind of the impermeable base material and the like.

As described above, the pretreatment liquid according to the embodiment of the present disclosure is used for an impermeable base material.

However, the pretreatment liquid according to the embodiment of the present disclosure may be used for both an impermeable base material and a permeable base material (for example, permeable paper, a permeable textile, or permeable non-woven fabric).

Here, the permeability of the permeable base material indicates the above-described property that the water absorption rate is greater than 2.5%.

Next, each component that may be contained in the pretreatment liquid according to the embodiment of the present disclosure will be described.

<Aggregating Agent>

The pretreatment liquid according to the embodiment of the present disclosure contains an aggregating agent.

The aggregating agent is a component for aggregating components (for example, a colorant) in the ink used for image recording.

The aggregating agent contained in the pretreatment liquid according to the embodiment of the present disclosure may be used alone or in combination of two or more kinds thereof.

It is preferable that the aggregating agent is at least one selected from the group consisting of a polyvalent metal compound, an organic acid, a metal complex, and a water-soluble cationic polymer.

The aggregating agent contains preferably at least one selected from the group consisting of a polyvalent metal compound, an organic acid, and a metal complex and more preferably an organic acid.

—Polyvalent Metal Compound—

Examples of the polyvalent metal compound include alkaline earth metals of a group 2 (such as magnesium and calcium) in the periodic table, transition metals of a group 3 (such as lanthanum) in the periodic table, cations of a group 13 (such as aluminum) in the periodic table, and salts of lanthanides (such as neodymium).

As salts of these metals, salts of organic acids, a nitrate, a chloride, and a thiocyanate described below are suitable.

Among these, a calcium salt or magnesium salt of an organic acid (such as formic acid, acetic acid, or a benzoate), a calcium salt or magnesium salt of nitric acid, calcium chloride, magnesium chloride, and a calcium salt or magnesium salt of thiocyanic acid are preferable.

Further, it is preferable that at least a part of the polyvalent metal compound is dissociated into polyvalent metal ions and counterions in the treatment liquid.

—Organic Acid—

As the organic acid, an organic compound containing an acidic group is exemplified.

Examples of the acidic group include a phosphoric acid group, a phosphonic acid group, a phosphinic acid group, a sulfuric acid group, a sulfonic acid group, a sulfinic acid group, and a carboxy group.

From the viewpoint of the aggregation rate of the ink, a phosphoric acid group or a carboxy group is preferable, and a carboxy group is more preferable as the acidic group.

Further, it is preferable that at least a part of the acidic group is dissociated in the treatment liquid.

Preferred examples of the organic compound containing a carboxy group include (meth)acrylic acid, poly(meth)acrylic acid, acetic acid, formic acid, benzoic acid, glycolic acid, malonic acid, malic acid (preferably DL-malic acid), maleic acid, succinic acid, glutaric acid, pimelic acid, adipic acid, fumaric acid, citric acid, tartaric acid, phthalic acid, 4-methylphthalic acid, lactic acid, pyrrolidone carboxylic acid, pyrrone carboxylic acid, pyrrole carboxylic acid, furan carboxylic acid, pyridine carboxylic acid, coumaric acid, thiophene carboxylic acid, and nicotinic acid. These compounds may be used alone or in combination of two or more kinds thereof.

From the viewpoint of the aggregation rate of the ink, as the organic compound containing a carboxy group, a di- or higher valent carboxylic acid (hereinafter, also referred to as polyvalent carboxylic acid) is preferable, and a dicarboxylic acid is more preferable.

As the polyvalent carboxylic acid, malonic acid, malic acid, maleic acid, succinic acid, glutaric acid, fumaric acid, tartaric acid, 4-methylphthalic acid, or citric acid is preferable, and malonic acid, malic acid, tartaric acid, glutaric acid, or citric acid is more preferable.

It is preferable that the organic acid has a low pKa (for example, 1.0 to 5.0). In this manner, the surface charge of particles such as polymer particles or the pigment stably dispersed in the ink by a weakly acidic functional group such as a carboxy group is reduced by bringing the ink into contact with an organic acidic compound having a lower pKa to degrade the dispersion stability.

It is preferable that the organic acid has a low pKa and a high solubility in water and is di- or higher valent and more preferable that the organic acid is a di- or trivalent acidic substance which has a high buffer capacity in a pH region whose pKa is lower than the pKa of the functional group (for example, a carboxy group) that allows the particles to be stably dispersed in the ink.

—Metal Complex—

As the metal complex, a metal complex including at least one selected from the group consisting of zirconium, aluminum, and titanium as a metal element is preferable.

As the metal complex, a metal complex including at least one selected from the group consisting of acetate, acetylacetonate, methylacetoacetate, ethylacetoacetate, octylene glycolate, butoxyacetylacetonate, lactate, lactate ammonium salt, and triethanol aminate as a ligand is preferable.

As the metal complex, various metal complexes are commercially available, and a commercially available metal complex may be used in the present disclosure. Further, various organic ligands, particularly various multidentate ligands that are capable of forming metal chelate catalysts are commercially available. Accordingly, a metal complex prepared by combining a commercially available organic ligand with a metal may be used.

Examples of the metal complex include zirconium tetraacetyl acetonate (for example, "ORGATIX ZC-150", manufactured by Matsumoto Fine Chemical Co., Ltd.), zirconium monoacetyl acetonate (for example, "ORGATIX ZC-540", manufactured by Matsumoto Fine Chemical Co., Ltd.), zirconium bisacetyl acetonate (for example, "ORGATIX ZC-550", manufactured by Matsumoto Fine Chemical Co., Ltd.), zirconium monoethyl acetoacetate (for example, "ORGATIX ZC-560", manufactured by Matsumoto Fine Chemical Co., Ltd.), zirconium acetate (for example, "ORGATIX ZC-115", manufactured by Matsumoto Fine Chemical Co., Ltd.), titanium diisopropoxy bis(acetylacetonate) (for example, "ORGATIX TC-100", manufactured by Matsumoto Fine Chemical Co., Ltd.), titanium tetraacetyl acetonate (for example, "ORGATIX TC-401", manufactured by Matsumoto Fine Chemical Co., Ltd.), titanium dioctyloxy bis(octylene glycolate) (for example, "ORGATIX TC-200", manufactured by Matsumoto Fine Chemical Co., Ltd.), titanium diisopropoxy bis(ethylacetoacetate) (for example, "ORGATIX TC-750", manufactured by Matsumoto Fine Chemical Co., Ltd.), zirconium tetraacetyl acetonate (for example, "ORGATIX ZC-700", manufactured by Matsumoto Fine Chemical Co., Ltd.), zirconium tributoxy monoacetyl acetonate (for example, "ORGATIX ZC-540", manufactured by Matsumoto Fine Chemical Co., Ltd.), zirconium monobutoxy acetyl acetonate bis(ethylacetoacetate) (for example, "ORGATIX ZC-570", manufactured by Matsumoto Fine Chemical Co., Ltd.), zirconium dibutoxy bis(ethylacetoacetate) (for example, "ORGATIX ZC-580", manufactured by Matsumoto Fine Chemical Co., Ltd.), aluminum trisacetyl acetonate (for example, "ORGATIX AL-80", manufactured by Matsumoto Fine Chemical Co., Ltd.), titanium lactate ammonium salt (for example, "ORGATIX TC-300", manufactured by Matsumoto Fine Chemical Co., Ltd.), titanium lactate (for example, "ORGATIX TC-310, 315", manufactured by Matsumoto Fine Chemical Co., Ltd.), titanium triethanol aminate (for example, "ORGATIX TC-400", manufactured by Matsumoto Fine Chemical Co., Ltd.), and a zirconyl chloride compound (for example, "ORGATIX ZC-126", manufactured by Matsumoto Fine Chemical Co., Ltd.).

Among these, titanium lactate ammonium salt (for example, "ORGATIX TC-300", manufactured by Matsumoto Fine Chemical Co., Ltd.), titanium lactate (for example, "ORGATIX TC-310, 315", manufactured by Matsumoto Fine Chemical Co., Ltd.), titanium triethanol aminate (for example, "ORGATIX TC-400", manufactured by Matsumoto Fine Chemical Co., Ltd.), and a zirconyl chloride compound (for example, "ORGATIX ZC-126", manufactured by Matsumoto Fine Chemical Co., Ltd.) are preferable.

—Water-Soluble Cationic Polymer—

Examples of the water-soluble cationic polymer include polyallylamine, polyallylamine derivatives, poly-2-hydroxypropyldimethylammonium chloride, and poly(diallyldimethylammoniumchloride).

The water-soluble cationic polymer can refer to the descriptions in known documents such as JP2011-042150A (particularly, paragraph 0156) and JP2007-098610A (particularly, paragraphs 0096 to 0108) as appropriate.

Examples of commercially available products of the water-soluble cationic polymer include SHALLOL (registered trademark) DC-303P and SHALLOL DC-902P (both manufactured by DKS Co., Ltd.), CATIOMASTER (registered trademark) PD-7 and CATIOMASTER PD-30 (both manufactured by Yokkaichi Chemical Co., Ltd.), and UNISENCE FPA100L (manufactured by Senka Corporation).

In the present disclosure, the term "water-soluble" indicates a property that 1 g or greater (preferably 3 g or greater or more preferably 10 g or greater) of a substance is dissolved in 100 g of water at 25° C.

The content of the aggregating agent in the pretreatment liquid is preferably in a range of 0.1% by mass to 40% by mass, more preferably in a range of 0.1% by mass to 30% by mass, still more preferably in a range of 1% by mass to 20% by mass, and particularly preferably in a range of 1% by mass to 10% by mass with respect to the total amount of the pretreatment liquid.

<Aqueous Medium>

The pretreatment liquid according to the embodiment of the present disclosure contains an aqueous medium.

The aqueous medium contained in the pretreatment liquid according to the embodiment of the present disclosure may be used alone or in combination of two or more kinds thereof.

Examples of the aqueous medium include water and a water-soluble organic solvent.

It is more preferable that the aqueous medium is water or a water-soluble organic solvent.

Examples of water include ion exchange water and distilled water.

The content of the aqueous medium is preferably 50% by mass or greater, more preferably 60% by mass or greater, and still more preferably 70% by mass or greater with respect to the total amount of the pretreatment liquid.

The upper limit of the content of the aqueous medium depends on the amounts of other components such as an aggregating agent, but is, for example, 95% by mass, preferably 90% by mass, and more preferably 85% by mass.

In a case where the aqueous medium contains water, the content of water is preferably 50% by mass or greater, more preferably 60% by mass or greater, and still more preferably 70% by mass or greater with respect to the total amount of the pretreatment liquid.

The upper limit of the content of water depends on the amounts of other components such as an aggregating agent, but is, for example, 95% by mass, preferably 90% by mass, and more preferably 85% by mass.

Examples of the water-soluble organic solvent include polyhydric alcohol such as glycerin, 1,2,6-hexanetriol, trimethylolpropane, alkanediol (for example, ethylene glycol, propylene glycol (1,2-propanediol), 1,3-propanediol, 1,3-butanediol, 1,4-butanediol, 2-butene-1,4-diol, 2-ethyl-1,3-hexanediol, 2-methyl-2,4-pentanediol, 1,2-octanediol, 1,2-hexanediol, 1,2-pentanediol, or 4-methyl-1,2-pentanediol), or polyalkylene glycol (for example, diethylene glycol, triethylene glycol, tetraethylene glycol, pentaethylene glycol, dipropylene glycol, or polyoxyethylene polyoxypropylene glycol); polyhydric alcohol ether such as polyalkylene glycol ether (for example, diethylene glycol monoalkyl ether, triethylene glycol monoalkyl ether, tripropylene glycol monoalkyl ether, or polyoxypropylene glyceryl ether); and sugar alcohols, hyaluronic acids, alkyl alcohols having 1 to 4 carbon atoms, glycol ethers, 2-pyrrolidone, and N-methyl-2-pyrrolidone described in paragraph 0116 of JP2011-042150A.

Among these, from the viewpoint of suppressing transfer of components, polyhydric alcohol or polyhydric alcohol ether is preferable, and alkanediol, polyalkylene glycol, or polyalkylene glycol ether is more preferable.

In a case where the pretreatment liquid contains a water-soluble organic solvent, the content of the water-soluble organic solvent in the pretreatment liquid is preferably 1% by mass to 25% by mass, more preferably in a range of 2% by mass to 20% by mass, and still more preferably in a range of 3% by mass to 15% by mass with respect to the total amount of the pretreatment liquid.

<Specific Resin>

The pretreatment liquid according to the embodiment of the present disclosure contains a specific resin.

The specific resin is a resin which has at least one selected from the group consisting of the following structural unit (1), the following structural unit (2), and the following structural unit (3) and has a glass transition temperature of −40° C. or higher and lower than 100° C.

The specific resin contained in the pretreatment liquid according to the embodiment of the present disclosure may be used alone or in combination of two or more kinds thereof.

(Glass Transition Temperature)

The glass transition temperature of the specific resin is −40° C. or higher and lower than 100° C.

The fact that the glass transition temperature of the specific resin is −40° C. or higher and lower than 100° C. contributes to improving the adhesiveness of the image to the impermeable base material.

Specifically, since the glass transition temperature of the specific resin is lower than 100° C., the film-forming property of the specific resin is improved, and the adhesiveness of the image is improved.

Further, since the glass transition temperature of the specific resin is −40° C. or higher, the film hardness of the image is improved, and the adhesiveness of the image is improved.

Further, the fact that the glass transition temperature of the specific resin is −40° C. or higher is also advantageous in terms of the temporal stability of the pretreatment liquid (specifically, the dispersion stability of the specific resin in the pretreatment liquid, the same applies hereinafter).

In the present disclosure, the glass transition temperature (hereinafter, also referred to as Tg) of the specific resin indicates the extrapolated glass transition starting temperature (hereinafter, also referred to as Tig) which is measured in conformity with the method described in JIS K 7121 (1987) or JIS K 6240 (2011) using differential scanning calorimetry (DSC).

The method of measuring the Tg (that is, Tig) in the present disclosure will be described in more detail.

First, the specific resin is maintained at a temperature lower than the expected Tg of the resin by approximately 50° C. until the device is stabilized, the resin is heated to a temperature higher than the temperature at which the glass transition is completed by approximately 30° C. at a heating rate of 20° C./min, and a differential thermal analysis (DTA) curve or a DSC curve is created.

The temperature of the intersection of a straight line obtained by extending the base line on a low temperature side in the DTA curve or the DSC curve onto a high temperature side and a tangent drawn at a point where the gradient of a curve from a step-like change portion of the glass transition is maximized is defined as Tg (that is, Tig).

Further, in a case where the pretreatment liquid contains two or more kinds of specific resins, the weighted average value obtained by weighting and averaging the glass transition temperatures of respective specific resins contained in the pretreatment liquid according to the mass fractions of the respective specific resins is defined as the glass transition temperature (Tg) of the specific resin contained in the pretreatment liquid.

From the viewpoint of further improving the adhesiveness of the image to the impermeable base material, the glass transition temperature of the specific resin is preferably 90° C. or lower, more preferably 60° C. or lower, and still more preferably 30° C. or lower.

Similarly, from the viewpoint of further improving the adhesiveness of the image to the impermeable base material and the temporal stability of the pretreatment liquid, the glass transition temperature of the specific resin is preferably −35° C. or higher, more preferably −30° C. or higher, still more preferably −20° C. or higher, even still more preferably −10° C. or higher, and even still more preferably 0° C. or higher.

(Structural Units (1) to (3): Specific Hydrophilic Structural Units)

The specific resin contains at least one selected from the group consisting of specific hydrophilic structural units, that is, structural units (1) to (3).

—Structural Unit (1)—

(1)

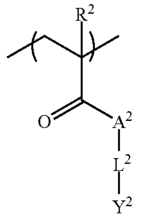

In the structural unit (1), $R^2$ represents a hydrogen atom or an alkyl group having 1 to 4 carbon atoms.

In the structural unit (1), it is preferable that $R^2$ represents a hydrogen atom or a methyl group.

In the structural unit (1), $A^2$ represents —NH— or —N($L^4$-$Y^4$)—.

—N($L^4$-$Y^4$)— will be described below.

In the structural unit (1), $L^2$ represents a divalent group which is one selected from the first group (that is, the first group consisting of an alkylene group, an alkenylene group, an alkynylene group, an arylene group, —O—, —NH—, —N($L^4$-$Y^4$)—, and —C(═O)—, a divalent group which is obtained by combining two or more selected from the first group, or a single bond.

—N($L^4$-$Y^4$)— will be described below.

Each of the alkyl group, the alkenyl group, the alkynyl group, the alkylene group, the alkenylene group, and the alkynylene group as $L^2$ in the structural unit (1) may be linear or may have a branched structure.

Each of the alkylene group, the alkenylene group, and the alkynylene group as $L^2$ in the structural unit (1) may have a substituent. As the substituent in this case, the same group as that represented by $Y^3$ in the structural unit (2) described below (that is, at least one selected from the group consisting of a halogen atom, —OH, —$OR^3$, —$NH_2$, —$NR^3H$, —$NR^3R^4$, and —C(═O)$R^3$, and $R^3$ and $R^4$ each independently represent an alkyl group, an alkenyl group, an alkynyl group, or an aryl group) is preferable.

The arylene group as $L^2$ in the structural unit (1) may have a substituent. As the substituent in this case, the same group as that represented by $Y^2$ described below (that is, at least one selected from the group consisting of an alkyl group, an alkenyl group, an alkynyl group, an aryl group, a halogen atom, —OH, —$OR^3$, —$NH_2$, —$NR^3H$, —$NR^3R^4$, and —C(═O)$R^3$, and $R^3$ and $R^4$ each independently represent an alkyl group, an alkenyl group, an alkynyl group, or an aryl group) is preferable.

From the viewpoint of enhancing the hydrophilicity of the entire structural unit (1), the number of carbon atoms of each of the alkylene group, the alkenylene group, and the alkynylene group as $L^2$ in the structural unit (1) is preferably in a range of 1 to 6, more preferably in a range of 1 to 4, and still more preferably 1 or 2.

From the viewpoint of enhancing the hydrophilicity of the entire structural unit (1), as the arylene group represented by $L^2$ in the structural unit (1), a phenylene group or a naphthylene group is preferable, and a phenylene group is more preferable.

As the "divalent group which is obtained by combining two or more selected from the first group" represented by $L^2$, a divalent group formed by combining at least one of an alkylene group, an alkenylene group, an alkynylene group, or an arylene group with at least one of —O—, —NH—, —N($L^4$-$Y^4$)—, or —C(═O)— is preferable, and the following group (AO2) is particularly preferable.

(AO2)

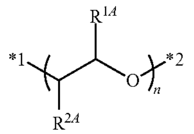

In the group (AO2), $R^{1A}$ and $R^{2A}$ each independently represent a hydrogen atom or a methyl group, n represents an integer of 1 to 8 (preferably an integer of 1 to 4 and more preferably 1 or 2), *1 represents a bonding position with respect to $A^2$, and *2 represents a bonding position with respect to $Y^2$.

It is preferable that in a case where one of $R^{1A}$ and $R^{2A}$ represents a methyl group, the other represents a hydrogen atom.

$L^2$ in the structural unit (1) represents preferably a single bond, an alkylene group having 1 to 6 carbon atoms (more preferably 1 to 4 carbon atoms and still more preferably 1 or 2 carbon atoms), an alkylene group having 1 to 6 carbon atoms (more preferably 1 to 4 carbon atoms and still more preferably 1 or 2 carbon atoms) which has been substituted with a hydroxy group, or a group (AO2) and more preferably a single bond or an alkylene group having 1 to 6 carbon atoms (more preferably 1 to 4 carbon atoms and still more preferably 1 or 2 carbon atoms).

In the structural unit (1), $Y^2$ represents an alkyl group, an alkenyl group, an alkynyl group, an aryl group, a halogen atom, —OH, —$OR^3$, —$NH_2$, —$NR^3H$, —$NR^3R^4$, or —C(═O)$R^3$.

$R^3$ and $R^4$ each independently represent an alkyl group, an alkenyl group, an alkynyl group, or an aryl group.

As the halogen atom as $Y^2$ in the structural unit (1), a fluorine atom, a chlorine atom, a bromine atom, or an iodine atom is preferable, a fluorine atom, a chlorine atom, or a bromine atom is more preferable, and a fluorine atom or a chlorine atom is still more preferable.

Each of the alkyl group, the alkenyl group, and the alkynyl group as $Y^2$ in the structural unit (1) may be linear or may have a branched structure.

The number of carbon atoms in each of the alkyl group, the alkenyl group, and the alkynyl group as $Y^2$ in the structural unit (1) is preferably in a range of 1 to 6, more preferably in a range of 1 to 4, and still more preferably 1 or 2.

As the aryl group represented by $Y^2$ in the structural unit (1), a phenyl group or a naphthyl group is preferable, and a phenyl group is more preferable.

The aryl group as $Y^2$ in the structural unit (1) may have a substituent. As the substituent in this case, the same group as that represented by $Y^2$ (that is, at least one selected from the group consisting of an alkyl group, an alkenyl group, an alkynyl group, an aryl group, a halogen atom, —OH, —$OR^3$, —$NH_2$, —$NR^3H$, —$NR^3R^4$, and —C(═O)$R^3$, and $R^1$ and $R^4$ each independently represent an alkyl group, an alkenyl group, an alkynyl group, or an aryl group) is preferable.

It is preferable that $Y^2$ in the structural unit (1) represents an alkyl group having 1 to 6 carbon atoms (more preferably 1 to 4 carbon atoms and still more preferably 1 or 2 carbon atoms), —OH, —$OR^3$, —$NH_2$, —$NR^3H$, —$NR^3R^4$, or —C(═O)$R^3$.

It is preferable that $R^3$ and $R^4$ each independently represent an alkyl group having 1 to 6 carbon atoms (more preferably 1 to 4 carbon atoms and still more preferably 1 or 2 carbon atoms).

In the structural unit (1), two of $A^2$, L, and $Y^2$ may be linked to each other to form a ring.

Next, —N($L^4$-$Y^4$)— in $A^2$ and $L^2$ will be described.

In —N($L^4$-$Y^4$)—, $L^4$ represents a divalent group which is one selected from the second group (that is, the second group consisting of an alkylene group, an alkenylene group, an alkynylene group, an arylene group, —O—, —NH—, and —C(═O)—), a divalent group which is obtained by combining two or more selected from the second group, or a single bond.

The second group is the same as the first group except that —N($L^4$-$Y^4$)— is not present.

In —N($L^4$-$Y^4$)—, $Y^4$ represents an alkyl group, an alkenyl group, an alkynyl group, an aryl group, a halogen atom, —OH, —$OR^3$, —$NH_2$, —$NR^3H$, —$NR^3R^4$, or —C(=O)$R^3$.

In $Y^4$, $R^3$ and $R^4$ each independently represent an alkyl group, an alkenyl group, an alkynyl group, or an aryl group.

$R^3$ and $R^4$ in —$NR^3R^4$ may be linked to each other to form a ring.

$L^4$ and $Y^4$ in —N($L^4$-$Y^4$)— may be linked to each other to form a ring.

The preferred embodiment of $L^4$ in —N($L^4$-$Y^4$)— is the same as the preferred embodiment of $L^2$.

$L^4$ in —N($L^4$-$Y^4$)— represents preferably a single bond, an alkylene group having 1 to 6 carbon atoms (more preferably 1 to 4 carbon atoms and still more preferably 1 or 2 carbon atoms), an alkylene group having 1 to 6 carbon atoms (more preferably 1 to 4 carbon atoms and still more preferably 1 or 2 carbon atoms) which has been substituted with a hydroxy group, or the following group (AO4) and more preferably a single bond or an alkylene group having 1 to 6 carbon atoms (more preferably 1 to 4 carbon atoms and still more preferably 1 or 2 carbon atoms).

(AO4)

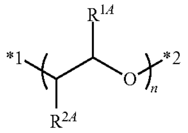

In the group (AO4), $R^{1A}$ and $R^{2A}$ each independently represent a hydrogen atom or a methyl group, n represents an integer of 1 to 8 (preferably an integer of 1 to 4 and more preferably 1 or 2), *1 represents a bonding position with respect to N (a nitrogen atom), and *2 represents a bonding position with respect to $Y^4$.

It is preferable that in a case where one of $R^{1A}$ and $R^{2A}$ represents a methyl group, the other represents a hydrogen atom.

It is still more preferable that $L^4$ in —N($L^4$-$Y^4$)— represents a single bond or an alkylene group having 1 to 6 carbon atoms (more preferably 1 to 4 carbon atoms and still more preferably 1 or 2 carbon atoms).

The preferred embodiment of $Y^4$ in —N($L^4$-$Y^4$)— is the same as the preferred embodiment of $Y^2$.

From the viewpoint of further enhancing the hydrophilicity of the entire structural unit (1), the number of carbon atoms of the entire structural unit (1) is preferably 30 or less, more preferably 20 or less, still more preferably 12 or less, and even still more preferably 8 or less. Further, the number of carbon atoms of the entire structural unit (1) is 3 or more, but is preferably 4 or more.

Further, in the structural unit (1), it is also preferable that "-$A^2$-$L^2$-$Y^2$" represents any one of the following groups (1A), . . . , or (1H). In the groups (1A) to (1H), * represents a bonding position.

(1A)

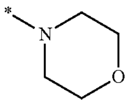

-continued (1B)

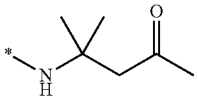

(1C)

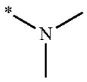

(1D)

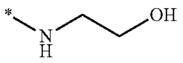

(1E)

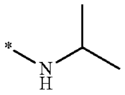

(1F)

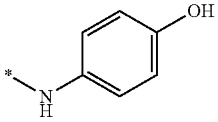

(1G)

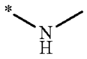

(1H)

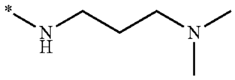

It is preferable that the structural unit (1) is a structural unit derived from a (meth)acrylamide compound or a structural unit derived from (meth)acryloyl morpholine.

The preferred number of carbon atoms in each of the (meth)acrylamide compound and the (meth)acryloyl morpholine is the same as the preferred number of carbon atoms in the entire structural unit (1).

In the present disclosure, the structural unit derived from the (meth)acrylamide compound indicates a structural unit formed of the (meth)acrylamide compound as a raw material.

The same applies to structural units derived from other compounds.

Hereinafter, specific examples of the structural unit (1) will be shown, but the structural unit (1) is not limited to the following specific examples.

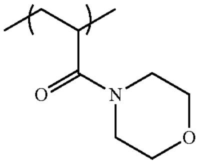

ACMO

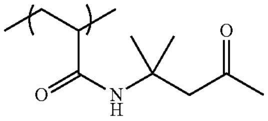

DAAM

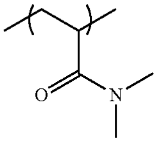

DMAAm

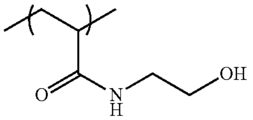

HEAAm

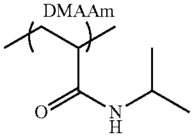

NIPAM

-continued (1-1)

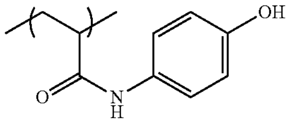

(1-2)

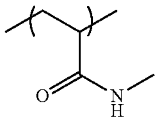

(1-3)

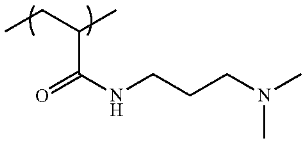

—Structural Unit (2)—

(2)

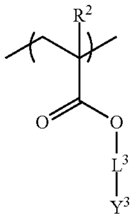

In the structural unit (2), $R^2$ represents a hydrogen atom or an alkyl group having 1 to 4 carbon atoms.

$R^2$ in the structural unit (2) has the same definition as that for $R^2$ in the structural unit (1), and the preferred embodiments thereof are also the same as described above.

In the structural unit (2), $L^3$ represents a divalent group which is one selected from the first group (that is, the first group consisting of an alkylene group, an alkenylene group, an alkynylene group, an arylene group, —O—, —NH—, —N($L^4$-$Y^4$)—, and —C(═O)—) or a divalent group which is obtained by combining two or more selected from the first group.

$L^3$ in the structural unit (2) is different from $L^2$ in the structural unit (1) in terms that $L^3$ does not represent a single bond.

Each of the alkyl group, the alkenyl group, the alkynyl group, the alkylene group, the alkenylene group, and the alkynylene group as $L^3$ in the structural unit (2) may be linear or may have a branched structure.

Each of the alkylene group, the alkenylene group, and the alkynylene group as $L^3$ in the structural unit (2) may have a substituent. As the substituent in this case, the same group as that represented by $Y^3$ described below (that is, at least one selected from the group consisting of a halogen atom, —OH, —$OR^3$, —$NH_2$, —$NR^3H$, —$NR^3R^4$, and —C(═O)$R^3$, and $R^3$ and $R^4$ each independently represent an alkyl group, an alkenyl group, an alkynyl group, or an aryl group) is preferable.

The arylene group as $L^3$ in the structural unit (2) may have a substituent. As the substituent in this case, the same group as that represented by $Y^2$ in the structural unit (1) described above (that is, at least one selected from the group consisting of an alkyl group, an alkenyl group, an alkynyl group, an aryl group, a halogen atom, —OH, —$OR^3$, —$NH_2$, —$NR^3H$, —$NR^3R^4$, and —C(═O)$R^3$, and $R^3$ and $R^4$ each independently represent an alkyl group, an alkenyl group, an alkynyl group, or an aryl group) is preferable.

From the viewpoint of further enhancing the hydrophilicity of the entire structural unit (2), the number of carbon atoms in each of the alkylene group, the alkenylene group, and the alkynylene group as $L^3$ in the structural unit (2) is preferably in a range of 1 to 6, more preferably in a range of 1 to 4, and still more preferably 1 or 2.

From the viewpoint of further enhancing the hydrophilicity of the entire structural unit (2), as the arylene group represented by $L^3$ in the structural unit (2), a phenylene group or a naphthylene group is preferable, and a phenylene group is more preferable.

As the "divalent group which is obtained by combining two or more selected from the first group" represented by $L^3$, a divalent group formed by combining at least one of an alkylene group, an alkenylene group, an alkynylene group, or an arylene group and at least one of —O—, —NH—, —N($L^4$-$Y^4$)—, or —C(═O)— is preferable, and the following group (AO3) is particularly preferable.

(AO3)

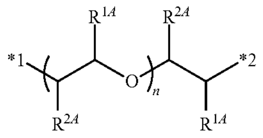

In the group (AO3), $R^{1A}$ and $R^{2A}$ each independently represent a hydrogen atom or a methyl group, n represents an integer of 1 to 8 (preferably an integer of 1 to 4 and more preferably 1 or 2), *1 represents a bonding position with respect to 0 (an oxygen atom), and *2 represents a bonding position with respect to $Y^3$.

It is preferable that in a case where one of $R^{1A}$ and $R^{2A}$ represents a methyl group, the other represents a hydrogen atom.

It is preferable that $L^3$ in the structural unit (2) represents an alkylene group having 1 to 6 carbon atoms (more preferably 1 to 4 carbon atoms and still more preferably 1 or 2 carbon atoms), an alkylene group having 1 to 6 carbon atoms (more preferably 1 to 4 carbon atoms and still more preferably 1 or 2 carbon atoms) which has been substituted with a hydroxy group, or a group (AO3).

In the structural unit (2), $Y^3$ represents a halogen atom, —OH, —$OR^3$, —$NH_2$, —$NR^3H$, —$NR^3R^4$, and —C(═O)$R^3$.

$R^3$ and $R^4$ each independently represent an alkyl group, an alkenyl group, an alkynyl group, or an aryl group.

$Y^3$ in the structural unit (2) is different from $Y^2$ in the structural unit (1) in terms that $Y^3$ does not represent any of an alkyl group, an alkenyl group, an alkynyl group, or an aryl group.

$Y^3$ in the structural unit (2) has the same definition as that for $Y^2$ in the structural unit (1) except for the above-described point, and the preferred embodiments thereof are also the same as described above.

It is still more preferable that $Y^3$ in the structural unit (2) represents —OH, —$NH_2$, or —$NR_3H$.

—N($L^4$-$Y^4$)— in the structural unit (2) has the same definition as that for —N($L^4$-$Y^4$)— in the structural unit (1), and the preferred embodiments thereof are also the same as described above.

$R^3$ and $R^4$ in the structural unit (2) each have the same definition as that for $R^3$ and $R^4$ in the structural unit (1), and the preferred embodiments thereof are also the same as described above.

$L^3$ and $Y^3$ in the structural unit (2) may be linked to each other to form a ring.

From the viewpoint of further enhancing the hydrophilicity of the entire structural unit (2), the number of carbon atoms of the entire structural unit (2) is preferably 30 or less, more preferably 20 or less, still more preferably 12 or less, and even still more preferably 10 or less. The number of carbon atoms in the entire structural unit (2) is 3 or more, but is preferably 4 or more.

Further, in the structural unit (2), it is also preferable that "$-L^3-Y^3$" represents any one of the following groups (2A), . . . , or (2R). In the groups (2A) to (2R), * represents a bonding position.

(2A)

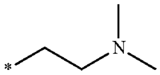

(2B)

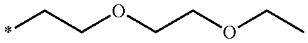

(2C)

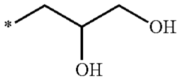

(2D)

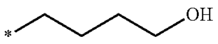

(2E)

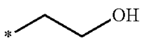

(2F)

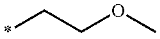

(2G)

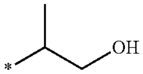

(2H)

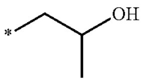

(2I)

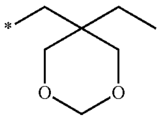

(2J)

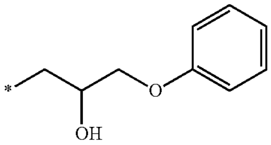

(2K)

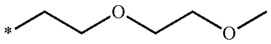

(2L)

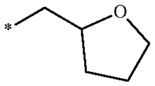

(2M)

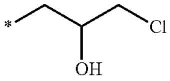

-continued (2N)

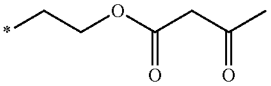

(2O)

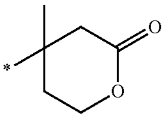

(2P)

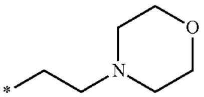

(2Q)

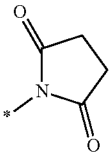

(2R)

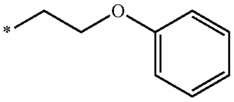

It is preferable that the structural unit (2) is a structural unit derived from a (meth)acrylate compound containing a hydrophilic group.

As the hydrophilic group in the (meth)acrylate compound containing a hydrophilic group, a hydroxy group, an alkoxy group, an amino group, a methylamino group, or a dimethylamino group is preferable.

The preferred number of carbon atoms of the (meth) acrylate compound containing a hydrophilic group is the same as the preferred number of carbon atoms of the entire structural unit (2).

Hereinafter, specific examples of the structural unit (2) will be shown, but the structural unit (2) is not limited to the following specific examples.

DMAEA

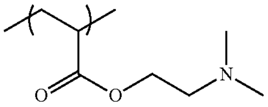

EOEOEA

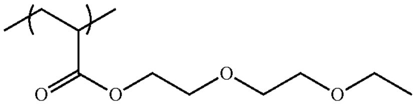

GLmMA

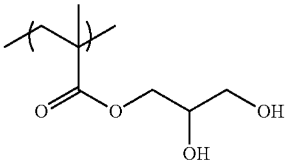

HBA

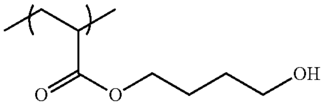

-continued

HEA

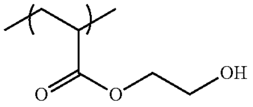

HEMA

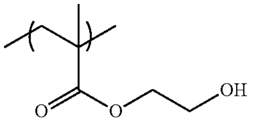

2MEA

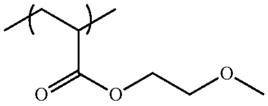

(2-1)

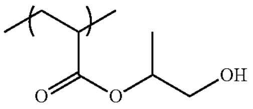

(2-2)

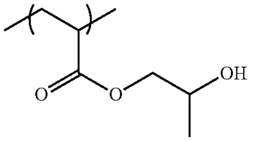

(2-3)

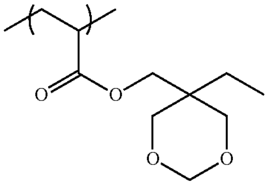

(2-4)

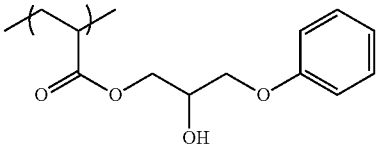

(2-5)

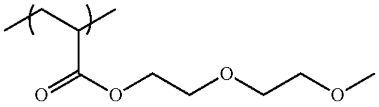

(2-6)

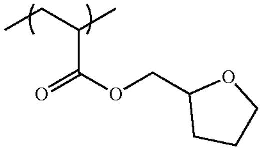

(2-7)

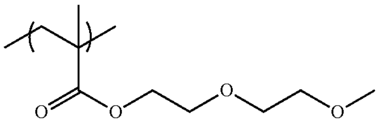

(2-8)

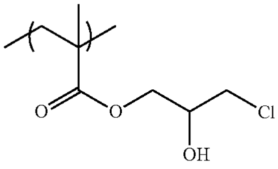

-continued (2-9)

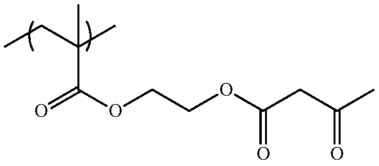

(2-10)

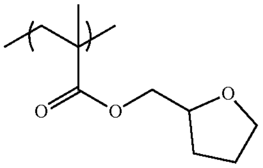

(2-11)

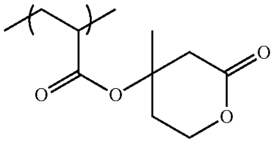

(2-12)

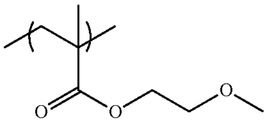

(2-13)

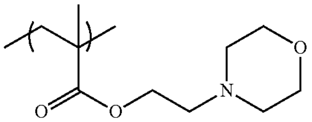

(2-14)

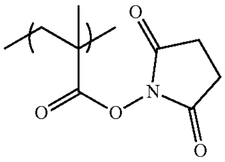

(2-15)

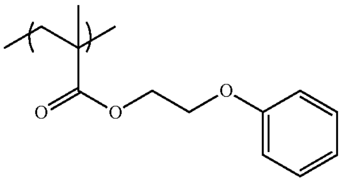

—Structural Unit (3)—

(3)

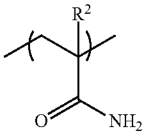

In the structural unit (3), $R^2$ represents a hydrogen atom or an alkyl group having 1 to 4 carbon atoms.

$R^2$ in the structural unit (3) has the same definition as that for $R^2$ in the structural unit (1), the preferred embodiments thereof are also the same as described above.

It is preferable that the structural unit (3) is a structural unit derived from (meth)acrylamide.

Hereinafter, specific examples of the structural unit (3) will be shown, but the structural unit (3) is not limited to the following specific examples.

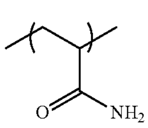
AAm

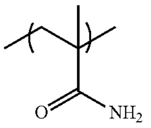
MAAm

The total content of the structural unit (1), the structural unit (2), and the structural unit (3) is preferably in a range of 3% by mass to 85% by mass with respect to the entirety of the specific resin.

In a case where the total content thereof is in a range of 3% by mass to 85% by mass, the adhesiveness of the image to the impermeable base material is further improved.

Specifically, in a case where the total content thereof is 3% by mass or greater, the effect from the specific hydrophilic structural unit (that is, at least one selected from the group consisting of the structural units (1) to (3)) is effectively exhibited, and thus the adhesiveness of the image to the impermeable base material is further improved.

In a case where the total content thereof is 85% by mass or less, the drying property of the pretreatment liquid is further improved, and thus the adhesiveness of the image to the impermeable base material is further improved.

From the viewpoint of further improving the adhesiveness of the image to the impermeable base material, the total content thereof is more preferably in a range of 5% by mass to 80% by mass and still more preferably in a range of 10% by mass to 60% by mass.

It goes without saying that the "total content of the structural unit (1), the structural unit (2), and the structural unit (3)" does not necessarily indicate that the specific resin has all the structural unit (1), the structural unit (2), and the structural unit (3).

For example, in a case where the specific resin has the structural unit (1) but does not have the structural unit (2) and the structural unit (3), the "total content of the structural unit (1), the structural unit (2), and the structural unit (3)" indicates the content of the structural unit (1).

From the viewpoint of further improving the temporal stability of the pretreatment liquid (specifically, the dispersion stability of the specific resin in the pretreatment liquid, the same applies hereinafter), it is preferable that the specific resin has at least one selected from the group consisting of the structural unit (1) and the structural unit (2).

(Structural Units (A) to (F))

From the viewpoint of further improving the adhesiveness of the image to the impermeable base material, it is preferable that the specific resin further has at least one selected from the group consisting of the following structural unit (A), the following structural unit (B), the following structural unit (C), the following structural unit (D), the following structural unit (E), and the following structural unit (F).

From the viewpoint of further improving the adhesiveness of the image, it is more preferable that the specific resin has at least one selected from the group consisting of the following structural unit (A) and the following structural unit (B).

(A)

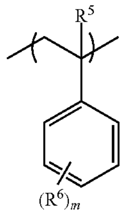

(B)

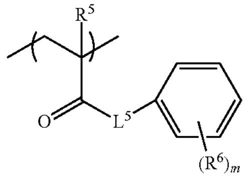

(C)

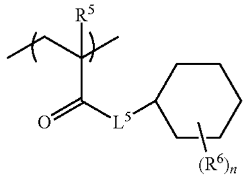

(D)

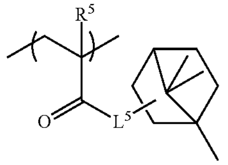

(E)

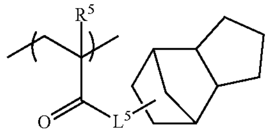

(F)

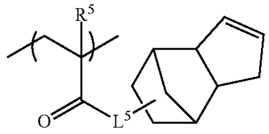

In the structural units (A) to (F), $R^5$ represents a hydrogen atom or a methyl group, $R^6$ represents an alkyl group, an alkenyl group, or an alkynyl group, m represents an integer of 0 to 5, n represents an integer of 0 to 11, and $L^5$ represents a divalent group which is one selected from the third group consisting of an alkylene group having 1 to 18 carbon atoms, an arylene group having 6 to 18 carbon atoms, —O—, —NH—, —S—, and —C(=O), a divalent group which is obtained by combining two or more selected from the third group, or a single bond.

In the structural units (A) to (F), the number of carbon atoms of the alkyl group represented by $R^6$ is preferably in a range of 1 to 4, more preferably 1 or 2, and still more preferably 1.

In the structural units (A) to (F), the number of carbon atoms in each of the alkenyl group and the alkynyl group represented by $R^6$ is preferably in a range of 2 to 4, more preferably 2 or 3, and still more preferably 2.

Further, $R^6$ may represent an unsubstituted group or a group substituted with a substituent. In a case where $R^6$ is substituted with a substituent, examples of the substituent include a halogen (such as a chlorine atom or a bromine atom) and an alkyl group (such as a methyl group or an ethyl group).

In the structural units (A) to (F), m represents the number of substituents for $R^6$ with respect to a benzene ring in each of the structural unit (A) and the structural unit (B).

Further, m represents an integer of 0 to 5, preferably an integer of 0 to 3, more preferably an integer of 0 to 2, and still more preferably 0 or 1.

In the structural units (A) to (F), n indicates the number of substituents for $R^6$ with respect to a cyclohexane ring in the structural unit (C).

Further, n represents an integer of 0 to 11, preferably an integer of 0 to 6, more preferably an integer of 0 to 2, and still more preferably 0 or 1.

In the structural units (A) to (F), $L^5$ represents a divalent group which is one selected from the third group consisting of an alkylene group having 1 to 18 carbon atoms, an arylene group having 6 to 18 carbon atoms, —O—, —NH—, —S—, and —C(═O)—, a divalent group which is obtained by combining two or more selected from the third group, or a single bond.

The alkylene group having 1 to 18 carbon atoms as L may be linear or may have a branched structure.

The number of carbon atoms of the alkylene group having 1 to 18 carbon atoms as $L^5$ is preferably in a range of 1 to 12, more preferably in a range of 1 to 6, and still more preferably 1 or 2.

Examples of the arylene group having 6 to 18 carbon atoms include a phenylene group, a naphthylene group, and a tolyl group.

The number of carbon atoms of the arylene group having 6 to 18 carbon atoms as $L^5$ is preferably in a range of 6 to 12 and more preferably in a range of 6 to 10.

As the "divalent group which is obtained by combining two or more selected from the third group" as $L^5$, a divalent group formed by combining at least one of an alkylene group having 1 to 18 carbon atoms or an arylene group having 6 to 18 carbon atoms with at least one of —O—, —NH—, —S—, or —C(═O)— is preferable, and the following group (AO5) or the following group (AO6) is particularly preferable.

(AO5)

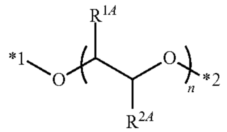

(AO6)

*1-O—$L^6$-2*

In the group (AO5), $R^{1A}$ and $R^{2A}$ each independently represent a hydrogen atom or a methyl group, n represents an integer of 1 to 8 (preferably an integer of 1 to 4 and more preferably 1 or 2), *1 represents a bonding position with respect to a carbonyl carbon atom, and *2 represents a bonding position with respect to a non-carbonyl carbon atom.

It is preferable that in a case where one of $R^{1A}$ and $R^{2A}$ represents a methyl group, the other represents a hydrogen atom.

In the group (AO6), $L^6$ represents an alkylene group having 1 to 8 carbon atoms (preferably 1 to 4 carbon atoms and more preferably 1 or 2 carbon atoms), *1 represents a bonding position with respect to a carbonyl carbon atom, and *2 represents the bonding position with respect to a non-carbonyl carbon atom.

It is preferable that $L^5$ represents a single bond, —O—, the group (AO5), or the group (AO6).

Hereinafter, specific examples of the structural unit (A) will be shown, but the structural unit (A) is not limited to the following specific examples.

St

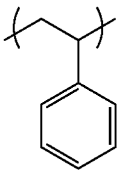

mSt

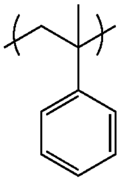

Hereinafter, specific examples of the structural unit (B) will be shown, but the structural unit (B) is not limited to the following specific examples.

BzA

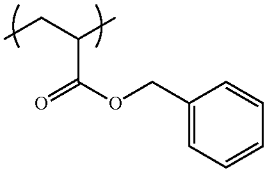

BzMA

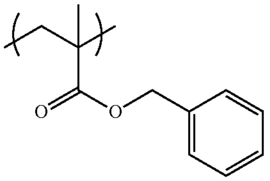

PhOEA

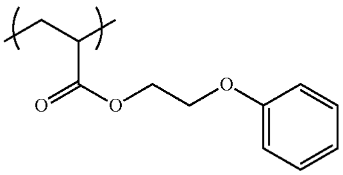

PhOEMA

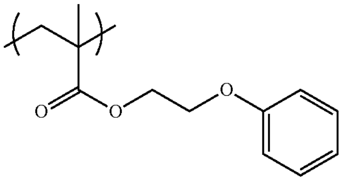

Hereinafter, specific examples of the structural unit (C) will be shown, but the structural unit (C) is not limited to the following specific examples.

CyHA

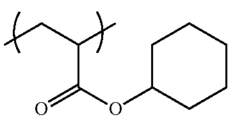

CyHMA

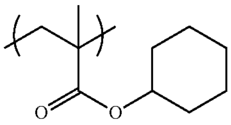

Hereinafter, specific examples of the structural unit (D) will be shown, but the structural unit (D) is not limited to the following specific examples.

IBOMA

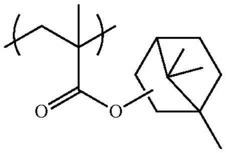

IBOA

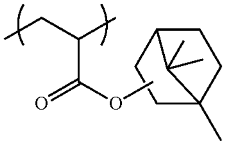

Hereinafter, specific examples of the structural unit (E) will be shown, but the structural unit (E) is not limited to the following specific examples.

DCPA

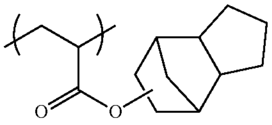

DCPMA

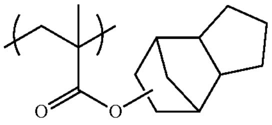

Hereinafter, specific examples of the structural unit (F) will be shown, but the structural unit (F) is not limited to the following specific examples.

DCPEOEA

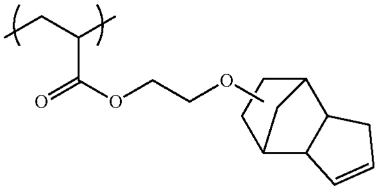

-continued

DCPEOEMA

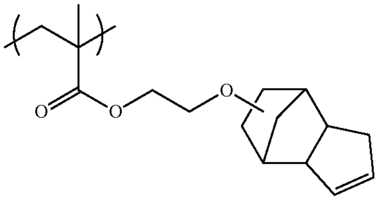

In a case where the specific resin contains at least one selected from the group consisting of the structural units (A) to (F), the total content of the structural units (A) to (F) is preferably 5% by mass or greater and more preferably 10% by mass or greater with respect to the entirety of the specific resin.

The upper limit of the total content of the structural units (A) to (F) in this case depends on the amounts of other structural units, but is, for example, 90% by mass, preferably 80% by mass, more preferably 70% by mass, still more preferably 60% by mass, even still more preferably 50% by mass, and even still more preferably 40% by mass.

In a case where the specific resin contains at least one selected from the group consisting of the structural unit (A) and the structural unit (B), the total content of the structural unit (A) and the structural unit (B) is preferably 5% by mass or greater and more preferably 10% by mass or greater with respect to the entirety of the specific resin.

The upper limit of the total content of the structural unit (A) and the structural unit (B) in this case depends on the amounts of other structural units, but is, for example, 90% by mass, preferably 80% by mass, more preferably 70% by mass, still more preferably 60% by mass, even still more preferably 50% by mass, and even still more preferably 40% by mass.

(Acidic Group)

From the viewpoint of further improving the temporal stability of the pretreatment liquid (specifically, the dispersion stability of the specific resin in the pretreatment liquid), it is preferable that the specific resin contains an acidic group. In this case, the specific resin may contain only one or two or more kinds of acidic groups.

As the acidic group, a sulfo group, a salt of the sulfo group, a carboxy group, a salt of the carboxy group, a phosphoric acid group, or a salt of the phosphoric acid group is preferable, a sulfo group, a salt of the sulfo group, a carboxy group, or a salt of the carboxy group is more preferable and a sulfo group or a salt of the sulfo group is still more preferable.

Examples of the counterion in the salt described above include an alkali metal ion such as a sodium ion, a potassium ion, or a lithium ion; an alkaline earth metal ion such as a calcium ion or a magnesium ion; and an ammonium ion.

(Structural Unit Containing Acidic Group)

In a case where the specific resin contains an acidic group, it is more preferable that the specific resin has at least one structural unit containing an acidic group (hereinafter, also referred to as an "acidic group unit").

In a case where the specific resin has an acidic group unit, from the viewpoint of further improving the temporal stability of the pretreatment liquid, the content of the acidic group unit is preferably 3% by mass or greater, more preferably 5% by mass or greater, still more preferably 7% by mass or greater, and even still more preferably 10% by mass or greater with respect to the entirety of the specific resin.

The upper limit of the content of the acidic group unit in this case depends on the amounts of other structural units, but is, for example, 25% by mass, preferably 20% by mass, and more preferably 15% by mass.

From the viewpoint of further improving the temporal stability of the pretreatment liquid, the following structural unit (4) or a structural unit derived from (meth)acrylic acid is preferable, and the following structural unit (4) is more preferable, as the acidic group unit.

—Structural Unit (4)—

From the viewpoint of further improving the temporal stability of the pretreatment liquid (specifically, the dispersion stability of the specific resin in the pretreatment liquid), it is preferable that the specific resin further has the following structural unit (4).

(4)

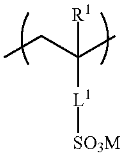

In the structural unit (4), $R^1$ represents a methyl group or a hydrogen atom, $L^1$ represents a divalent group which is one selected from the fourth group consisting of an alkylene group having 1 to 10 carbon atoms, an arylene group having 6 to 10 carbon atoms, —O—, —NH—, —S—, —C(═O)—, and —CH(—OH)—, a divalent group which is obtained by combining two or more selected from the fourth group, or a single bond, and M represents a hydrogen atom or a cation.

In the structural unit (4), the alkylene group having 1 to 10 carbon atoms represented by $L^1$ may be a linear alkylene group or may have a branched structure and/or a cyclic structure.

In the structural unit (4), as the "divalent group which is obtained by combining two or more selected from the fourth group" represented by $L^1$, a divalent group formed by combining at least one of an alkylene group 1 to 10 carbon atoms or an arylene group having 6 to 10 carbon atoms with at least one of —O—, —NH—, —S—, —C(═O)—, or —CH(—OH)— is preferable, and the divalent group shown below is more preferable.

In the divalent group shown below, n represents an integer of 1 to 5, *1 represents a bonding position with respect to a carbon atom, and *2 represents a bonding position with respect to a sulfur atom.

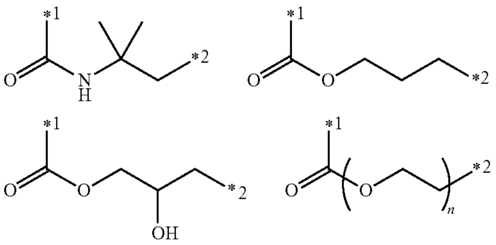

-continued

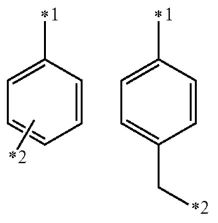

In the structural unit (4), M represents a hydrogen atom or a cation.

Examples of the cation represented by M include an alkali metal ion such as a sodium ion, a potassium ion, or a lithium ion; an alkaline earth metal ion such as a calcium ion or a magnesium ion; and an ammonium ion.

Examples of the monomer for forming the structural unit (4) include 2-acrylamido-2-methylpropanesulfonic acid, vinylsulfonic acid, styrenesulfonic acid, α-methylstyrenesulfonic acid, 2-sulfoethyl (meth)acrylate, 3-sulfopropyl (meth)acrylate, methacryloyloxyethyl sulfonic acid, vinylbenzyl sulfonic acid, 1-allyloxy-2-hydroxypropanesulfonic acid, allyloxypolyethylene glycol (the repetition number of the ethylene glycol moiety: 10) sulfonic acid, and salts of these compounds.

Examples of the counterion in the salt described above include the cation represented by M described above.

As the monomer for forming the structural unit (4), 2-acrylamido-2-methylpropanesulfonic acid, a salt of 2-acrylamido-2-methylpropanesulfonic acid, or 3-sulfopropyl (meth)acrylate is preferable.

As the counterion in the salt, a sodium ion, a potassium ion, a lithium ion, or an ammonium ion is preferable.

Among these, as the monomer for forming the structural unit (4), 2-acrylamido-2-methylpropanesulfonic acid or sodium 2-acrylamido-2-methylpropane sulfonate is more preferable.

Hereinafter, specific examples of the structural unit (4) will be shown, but the structural unit (4) is not limited to the following specific examples.

AMPSNa

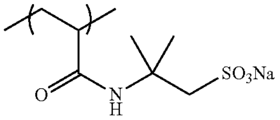

AMPSK

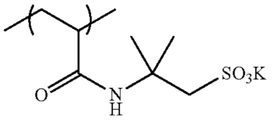

AMPS

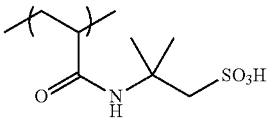

(4-1)

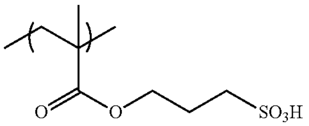

-continued (4-2)

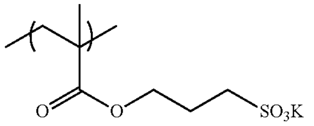

(4-3)

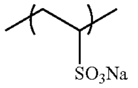

(4-4)

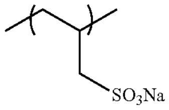

(4-5)

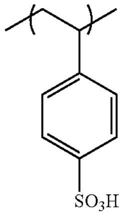

(4-6)

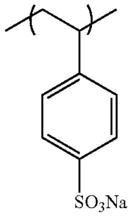

(4-7)

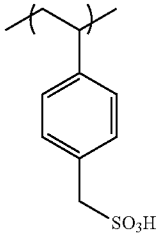

(4-8)

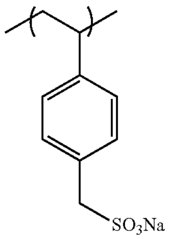

(4-9)

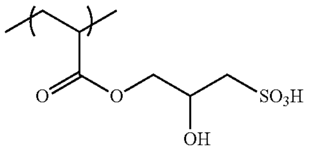

(4-10)

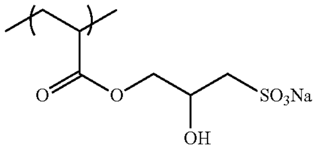

-continued (4-11)

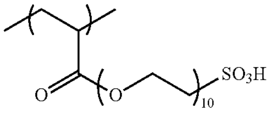

(4-12)

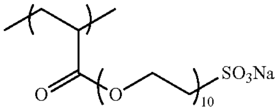

In a case where the specific resin has the structural unit (4), from the viewpoint of further improving the temporal stability of the pretreatment liquid, the content of the structural unit (4) is preferably 3% by mass or greater, more preferably 5% by mass or greater, still more preferably 7% by mass or greater, and even still more preferably 10% by mass or greater with respect to the entirety of the specific resin.

The upper limit of the content of the structural unit (4) in this case depends on the amounts of other structural units, but is, for example, 25% by mass, preferably 20% by mass, and still more preferably 15% by mass.

—Structural Unit Derived from (Meth)Acrylic Acid—

A carboxy group in a structural unit derived from (meth) acrylic acid may be neutralized (that is, the carboxy group may be in the form of a salt of the carboxy group).

Hereinafter, specific examples of the structural units derived from (meth)acrylic acid will be shown, but the structural unit derived from (meth)acrylic acid is not limited to the following specific examples.

AA

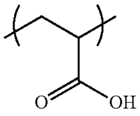

MAA

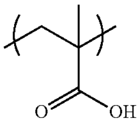

Specific examples of the structural unit derived from (meth)acrylic acid include a structural unit in which a carboxy group in AA and MAA is in the form of a salt of the carboxy group (such as —COONa or —COOK).

In a case where the specific resin has a structural unit derived from (meth)acrylic acid, from the viewpoint of further improving the temporal stability of the pretreatment liquid, the content of the structural unit derived from (meth) acrylic acid is preferably 3% by mass or greater, more preferably 5% by mass or greater, still more preferably 7% by mass or greater, and even still more preferably 10% by mass or greater with respect to the entirety of the specific resin.

The upper limit of the content of the structural unit derived from (meth)acrylic acid in this case depends on the amounts of other structural units, but is, for example, 25% by mass, preferably 20% by mass, and more preferably 15% by mass.

(Other Structural Units)

The specific resin may have structural units other than the structural units described above.

Examples of other structural units include a structural unit derived from (meth)acrylate having a chain alkyl group (that is, a linear or branched alkyl group).

Specific examples of other structural units are shown below, but other structural units are not limited to the following specific examples.

MA

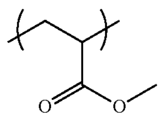

MMA

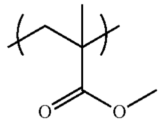

EMA

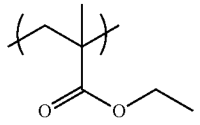

nBMA

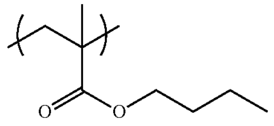

2EHMA

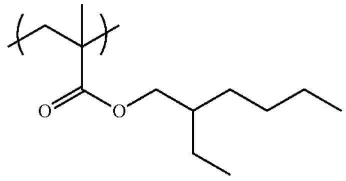

nBA

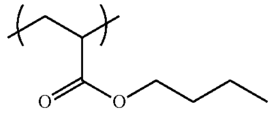

From the viewpoint of further suppressing streak unevenness of the image, the content of the structural unit derived from (meth)acrylate containing a chain alkyl group having 2 or more carbon atoms (that is, a linear or branched alkyl group) (hereinafter, also referred to as a "C2 or more chain alkyl group unit") is preferably less than 5% by mass, more preferably 4% by mass or less, still more preferably 3% by mass or less, and even still more preferably 0% by mass (that is, the specific resin does not have a C2 or more chain alkyl group unit) with respect to the total amount of the specific resin.

For example, in the specific examples of other structural units described above, EMA, nBMA, 2EHMA, and nBA are C2 or more chain alkyl group units.

It goes without saying that MA, MMA, AA, and MAA do not correspond to the C2 or more chain alkyl group units.

Here, the streak unevenness of the image indicates streak-like unevenness that is present in a solid image.

It is considered that the streak unevenness of the image occurs due to insufficient spread of ink droplets in a case where the wettability of the surface of the impermeable base material onto which the pretreatment liquid has been applied is insufficient.

As described above, in a case where the content of the C2 or more chain alkyl group unit in the specific resin is less than 5% by mass, the streak unevenness of the image is significantly suppressed.

The reason for this is not clear, but it is considered that the C2 or more chain alkyl group unit has a property of degrading the wettability of the surface of the impermeable base material onto which the pretreatment liquid has been applied.

The weight-average molecular weight of the specific resin is preferably in a range of 3000 to 2000000, more preferably in a range of 10000 to 1500000, still more preferably in a range of 10000 to 1000000, and even still more preferably in a range of 30000 to 200000.

In a case where the weight-average molecular weight of the specific resin is 3000 or greater, the adhesiveness of the image to the impermeable base material is further improved.

In a case where the weight-average molecular weight of the specific resin is 2000000 or less, the dispersion stability of the specific resin is further improved.

In the present disclosure, the weight-average molecular weight (Mw) indicates a value measured according to gel permeation chromatography (GPC) unless otherwise specified.

The measurement according to gel permeation chromatography (GPC) is performed using HLC (registered trademark)-8020GPC (manufactured by Tosoh Corporation) as a measuring device, three columns of TSKgel (registered trademark) Super Multipore HZ-H (manufactured by Tosoh Corporation, 4.6 mmID×15 cm), and tetrahydrofuran (THF) as an eluent. Further, as the measurement conditions, the measurement is performed at a sample concentration of 0.45% by mass, a flow rate of 0.35 ml/min, a sample injection volume of 10 μl, and a measurement temperature of 40° C. using a refractive index (RI) detector.

Further, the calibration curve is prepared using eight samples of "F-40", "F-20", "F-4", "F-1", "A-5000", "A-2500", "A-1000", and "n-propylbenzene" which are "Standard Samples TSK standard, polystyrene" (manufactured by Tosoh Corporation).

It is preferable that the specific resin is a water-insoluble resin.

In the present disclosure, the term "water-insoluble" in a water-insoluble resin indicates a property that the amount of a substance to be dissolved in 100 g of water at 25° C. is less than 1.0 g (more preferably less than 0.5 g).

In a case where the specific resin is a water-insoluble resin, the specific resin is present in the form of resin particles in the pretreatment liquid.

The volume average particle diameter of the resin particles is preferably in a range of 1 nm to 300 nm, more preferably in a range of 3 nm to 200 nm, and still more preferably in a range of 5 nm to 150 nm.

In the present disclosure, the volume average particle diameter indicates a value measured using a laser diffraction scattering particle size distribution analyzer.

As a measuring device, a particle size distribution measuring device "MICROTRAC MT-3300II" (manufactured by Nikkiso Co., Ltd.) is exemplified.

In regard to the resin particles, the description in paragraphs 0137 to 0171 of WO2017/163738A and paragraphs 0036 to 0081 of JP2010-077218A may be referred to.

The content of the specific resin in the pretreatment liquid according to the embodiment of the present disclosure is preferably in a range of 1% by mass to 25% by mass, more preferably in a range of 2% by mass to 20% by mass, still more preferably in a range of 3% by mass to 15% by mass, and even still more preferably in a range of 5% by mass to 15% by mass with respect to the total amount of the pretreatment liquid.

In a case where the content of the specific resin is 1% by mass or greater, the adhesiveness of the image to the impermeable base material is further improved.

In a case where the content of the specific resin is 25% by mass or less, the viscosity of the pretreatment liquid is further reduced, and the imparting property of the pretreatment liquid is further improved.

<Content Mass Ratio of Specific Resin to Aggregating Agent>

The content mass ratio of the specific resin to the aggregating agent in the pretreatment liquid according to the embodiment of the present disclosure (hereinafter, also referred to as the "content mass ratio [specific resin/aggregating agent]") is not particularly limited.

The content mass ratio [specific resin/aggregating agent] is preferably in a range of 0.2 to 20, more preferably in a range of 0.5 to 10, and still more preferably in a range of 1.0 to 10.

In a case where the content mass ratio [specific resin/aggregating agent] is 0.2 or greater, the adhesiveness of the image to the impermeable base material is further improved.

In a case where the content mass ratio [specific resin/aggregating agent] is 20 or less, the streak unevenness is further reduced.

<Distance Between Hansen Solubility Parameters of Specific Resin and Aqueous Medium (HSP Distance)>.

In the pretreatment liquid according to the embodiment of the present disclosure, the distance between the Hansen solubility parameters of the specific resin and the aqueous medium is not particularly limited.

Hereinafter, the Hansen solubility parameter may be referred to as HSP, and the distance between the Hansen solubility parameters may be referred to as the HSP distance.

The HSP distance between the specific resin and the aqueous medium is preferably in a range of 33 $MPa^{1/2}$ to 40 $MPa^{1/2}$.

In this manner, the adhesiveness of the image to the impermeable base material is further improved.

The HSP distance between the specific resin and the aqueous medium is more preferably in a range of 34 $MPa^{1/2}$ to 40 $MPa^{1/2}$ and still more preferably in a range of 34 $MPa^{1/2}$ to 38 $MPa^{1/2}$.

The Hansen solubility parameter (HSP) is a value obtained by quantifying the solubility of a substance (X) in another substance (Z) using a multidimensional vector. As the distance between the vectors of X and Z decreases, the dissolution can be easily made (the compatibility is high).

In the present disclosure, three vectors (δD (dispersion term), δP (polarization term), and δH (hydrogen bond term)) are determined using HSPiP software (see https://www.pirika.com/JP/HSP/index.html, https://www.hansen-solubility.com/Index.php?id=11) in regard to HSPs of the "aqueous medium" and the "resin". The HSP distance is defined as a value calculated by applying δD (dispersion term), δP (polarization term), and SH (hydrogen bond term) of each of two kinds of objects intended to be compared to the following formula. For example, the HSP distance between the specific resin and the aqueous medium can be acquired by applying the dispersion term, the polarization term, and the hydrogen bond term of the specific resin as [$\delta D_1$], [$\delta P_1$], and [$\delta H_1$] respectively, to the following formula and by applying the dispersion term, the polarization term, and the hydrogen bond term of the aqueous medium as [$\delta D_2$], [$\delta P_2$], and [$\delta H_2$] respectively, to the following formula.

$$\text{HSP distance}=4(\delta D_1-\delta D_2)^2+(\delta P_1-\delta P_2)^2+(\delta H_1-\delta H_2)^2$$

Hereinafter, a method of calculating the HSP distance between the specific resin and the aqueous medium will be described in detail.

—Calculation of $\delta D_1$, $\delta P_1$, and $\delta H_1$ of Specific Resin—

$\delta D_1$, $\delta P_1$, and $\delta H_1$ of the specific resin are calculated by respectively calculating δD, δP, and δH for each of the structural units constituting the specific resin, multiplying δD, δP, and δH by the molar fraction of each structural unit in the specific resin, and summing the obtained values.

First, for example, the structural formula for calculating HSP is converted into Smiles notation using structural formula editor software (ChemBioDraw Ultra 13.0) for each structural unit of the resin, as listed in Table 1. Thereafter, the bonding point * of the obtained Smiles notation polymer is rewritten to X, and the values of δD, δP, and δH of each structural unit are calculated based on Y-MB of HSPiP (HSPiP 4th edition 4.1.07).

TABLE 1

| | Structural formula for calculating HSP | Smiles notation | HSP δD | δP | δH |
|---|---|---|---|---|---|
| HEMA | 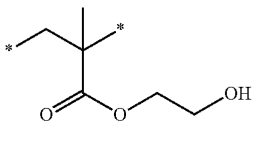 [SMILES: *CC(*)(C)C(=O)OCCO] | O=C(OCCO)C(X)(C)CX | 17.2 | 5.3 | 12.4 |
| IBOMA | 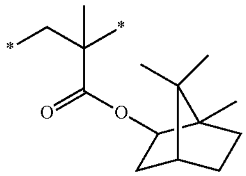 [SMILES: *CC(*)(C)C(=O)OC1CC2CCC1(C)C2(C)C] | XCC(C(OC1CC2CCC1(C)C2(C)C)=O)(C)X | 16.9 | 0.9 | 1.3 |

TABLE 1-continued

| | Structural formula for calculating HSP | Smiles notation | HSP δD | δP | δH |
|---|---|---|---|---|---|
| MMA | 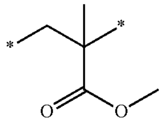 [SMILES: *CC(*)(C)C(=O)OC] | O═C(OC)C(CX)(C)X | 16.6 | 1.8 | 4.0 |
| MAA | 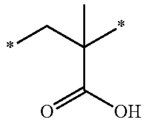 [SMILES: *CC(*)(C)C(=O)O] | XC(CX)(C)C(O)═O | 17.0 | 3.4 | 12.6 |

In a case where the molar fractions of HEMA, IBOMA, MMA, and MAA which are resins formed of the structural units listed in Table 1 are respectively 0.21, 0.24, 0.40, and 0.15, $\delta D_1$, $\delta P_1$, and $\delta H_1$ are calculated as follows.

$$\delta D_1=0.21=17.2(\text{HEMA})+0.24=16.9(\text{IBOMA})+0.40\times 16.6(\text{MMA})+0.15\times 17.0(\text{MAA})\approx 16.9$$

$$\delta P_1=0.21\times 5.3(\text{HEMA})+0.24\times 0.9(\text{IBOMA})+0.40\times 1.8(\text{MMA})+0.15\times 3.4\ (\text{MAA})\approx 2.6$$

$$\delta H_1=0.21\times 12.4(\text{HEMA})+0.24\times 1.3(\text{IBOMA})+0.40\times 4.0(\text{MMA})+0.15\times 12.6(\text{MAA})\approx 6.4$$

—Calculation of $\delta D_2$, $\delta P_2$, and $\delta H_2$ of Aqueous Medium—

δD, δP, and δH for each compound constituting the aqueous medium are derived from the registration data of HSPiP (HSPiP 4th edition 4.1.07), δD, δP, and δH are multiplied by the volume fraction of each compound in the aqueous medium, and the total of the obtained values is calculated. The volume fraction is a volume fraction at 25° C. and 1 atm.

First, it is assumed that the aqueous medium is a mixed solution of water and propylene glycol (PG), and the volume ratio of water to PG (water:PG) is 78:22 (volume ratio). δD, δP, and δH of water and PG are listed in Table 2.

TABLE 2

| | HSP (registered value) δD | δP | δH |
|---|---|---|---|
| Water | 15.5 | 16.0 | 42.3 |
| PG | 16.8 | 10.4 | 21.3 |

$\delta D_2$, $\delta P_2$, and $\delta H_2$ are calculated as follows.

$$\delta D_2=0.78\times 15.5(H_2O)+0.22\times 16.8(\text{PG})\approx 15.8$$

$$\delta P_2=0.78\times 16.0(H_2O)+0.22\times 10.4(\text{PG})\approx 14.8$$

$$\delta H_2=0.78\times 42.3(H_2O)+0.22\times 21.3(\text{PG})\approx 37.7$$

As described above, the HSP distance between the resin and the aqueous medium is as follows.

$$\text{HSP distance}=\{4\times(16.9-15.8)^2+(2.6-14.8)^2+(6.4-37.7)^2\}^{1/2}\leq 33.7$$

<HSP Distance Between Specific Resin and Aggregating Agent>

In the pretreatment liquid according to the embodiment of the present disclosure, the HSP distance between the specific resin and the aggregating agent (that is, the distance between the Hansen solubility parameters) is not particularly limited.

The HSP distance between the specific resin and the aggregating agent is preferably in a range of 5 $MPa^{1/2}$ to 28 $MPa^{1/2}$.

In this manner, the adhesiveness of the image to the impermeable base material is further improved.

The HSP distance between the specific resin and the aggregating agent is more preferably in a range of 6 $MPa^{1/2}$ to 25 $MPa^{1/2}$.

The HSP distance between the specific resin and the aggregating agent is acquired by the same method as the method for the HSP distance between the specific resin and the aqueous medium.

<Surfactant>

The pretreatment liquid may contain at least one surfactant.

The surfactant can be used as a surface tension adjuster or an antifoaming agent. Examples of the surface tension adjuster or the antifoaming agent include a non-ionic surfactant, a cationic surfactant, an anionic surfactant, and a betaine surfactant. Among these, from the viewpoint of the aggregation rate of the ink, a non-ionic surfactant or an anionic surfactant is preferable.

Examples of the surfactant include compounds exemplified as surfactants in pp. 37 and 38 of JP1984-157636A (JP-S59-157636A) and Research Disclosure No. 308119 (1989). Further, other examples of the surfactant include fluorine (fluorinated alkyl)-based surfactants and silicone-based surfactants described in JP2003-322926A, JP2004-325707A, and JP2004-309806A.

For example, in a case where the pretreatment liquid contains a surfactant as an antifoaming agent, the content of the surfactant as an antifoaming agent is preferably in a range of 0.0001% by mass to 1% by mass and more preferably in a range of 0.001% by mass to 0.1% by mass with respect to the total amount of the pretreatment liquid.

<Other Components>

The pretreatment liquid may contain other components in addition to the above-described components as necessary.

Examples of other components that may be contained in the pretreatment liquid include known additives such as a solid wetting agent, colloidal silica, an inorganic salt, a fading inhibitor, an emulsion stabilizer, a penetration enhancer, an ultraviolet absorbing agent, a preservative, a fungicide, a pH adjuster, a viscosity adjuster, a rust inhibitor, a chelating agent, and a water-soluble polymer compound other than a water-soluble cationic polymer (for example, water-soluble polymer compounds described in paragraphs 0026 to 0080 of JP2013-001854A).

Further, specific examples of commercially available products of the water-soluble polymer compounds include the followings.

AQUALIC HL, ACRYSET ARL-453 (Nippon Shokubai Co., Ltd.)

ISOBAN-600 (Kuraray Co., Ltd.)

AQ NYLON P-95 (Toray Industries, Inc.)

KURARAY POVAL PVA-105 (Kuraray Co., Ltd.)

3-SQ100 (Taisei Fine Chemical Co., Ltd.)

ALKOX L-6 (Meisei Chemical Works, Ltd.)

PLASCOAT Z-221 (Goo Chemical Co., Ltd.)

JURYMER AT-210 (Toagosei Co., Ltd.)

Watersol EFD-5560 (DIC Corporation)

Further, specific examples of synthetic compounds of the water-soluble polymer compounds include the followings.

AMPSNa

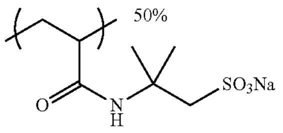

HEMA

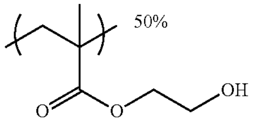

(Composition of each structural unit: 50% by mass of AMPSNa, 50% by mass of HEMA)

However, the water-soluble polymer compounds are not limited to these specific examples.

The content of the water-soluble polymer compounds is preferably in a range of 1% to 50% by mass, more preferably in a range of 1% to 30% by mass, and still more preferably in a range of 5% to 15% by mass with respect to the entirety of the specific resin.

—Physical Properties of Pretreatment Liquid—

From the viewpoint of the aggregation rate of the ink, the pH of the treatment liquid at 25° C. is preferably in a range of 0.1 to 3.5.

In a case where the pH of the pretreatment liquid is 0.1 or greater, the roughness of the impermeable base material is further decreased and the adhesiveness of the image area is further improved.

In a case where the pH of the pretreatment liquid is 3.5 or less, the aggregation rate is further improved, coalescence of dots (ink dots) caused by the ink on the surface of the impermeable base material is further suppressed, and the roughness of the image is further decreased.

The pH of the pretreatment liquid at 25° C. is more preferably in a range of 0.2 to 2.0.

The pH is a value measured at 25° C. using a commercially available pH meter.

From the viewpoint of the aggregation rate of the ink, the viscosity of the pretreatment liquid is preferably in a range of 0.5 mPa·s to 10 mPa·s and more preferably in a range of 1 mPa=s to 5 mPa·s.

The viscosity is a value measured at 25° C. using a viscometer.

As the viscometer, for example, a VISCOMETER TV-22 type viscometer (manufactured by Toki Sangyo Co., Ltd.) can be used.

The surface tension of the pretreatment liquid at 25° C. is preferably 60 mN/m or less, more preferably in a range of 20 mN/m to 50 mN/m, and still more preferably in a range of 30 mN/m to 45 mN/m.

The surface tension is a value measured at a temperature of 25° C.

The surface tension can be measured using, for example, an Automatic Surface Tentiometer CBVP-Z (manufactured by Kyowa Interface Science Co., Ltd.).

[Ink Set]

The ink set according to the embodiment of the present disclosure comprises the above-described pretreatment liquid according to the embodiment of the present disclosure and an ink containing water and a colorant.

According to the ink set according to the embodiment of the present disclosure, the image recording (that is, the image recording carried out by applying the pretreatment liquid onto the impermeable base material and applying the ink onto the surface of the impermeable base material onto which the pretreatment liquid has been applied to record an image) can be performed in the above-described manner.

Therefore, according to the ink set according to the embodiment of the present disclosure, an image with excellent adhesiveness to an impermeable base material can be recorded.

The ink set according to the embodiment of the present disclosure may comprise only one or two or more kinds of inks.

The ink set according to the embodiment of the present disclosure may comprise only one or two or more kinds of pretreatment liquids.

As a preferred embodiment of the ink set according to the present disclosure, an embodiment of the ink set comprising two or more kinds of inks and one or more kinds of pretreatment liquids is exemplified.

According to such an embodiment, a multicolor image can be recorded.

Examples of the two or more kinds of inks include three kinds of inks consisting of cyan ink, magenta ink, and yellow ink; four kinds of inks consisting of cyan ink, magenta ink, yellow ink, and black ink: four or more kinds of inks consisting of the above-described three kinds of colored inks and at least one selected from white ink, green ink, orange ink, violet ink, light cyan ink, light magenta ink, or light yellow ink; and five or more kinds of inks consisting of the above-described four kinds of colored inks and at least one selected from white ink, green ink, orange ink, violet ink, light cyan ink, light magenta ink, or light yellow ink.

However, two or more kinds of inks are not limited to these specific examples.

<Ink>

The ink in the ink set according to the embodiment of the present disclosure contains a colorant and water.

It is preferable that the ink is an aqueous ink.

Here, the aqueous ink indicates an ink having a water content of 50/by mass or greater with respect to the total amount of the ink.

Further, the content of the organic solvent in the ink is preferably 40% by mass or less and more preferably 30% by mass or less with respect to the total amount of the ink.

Further, the content of the polymerizable compound (such as a cationic polymerizable compound or a radically polymerizable compound) in the ink is preferably 10% by mass or less with respect to the total amount of the ink.

(Colorant)

An organic pigment or an inorganic pigment is preferable as the colorant.

Examples of the organic pigment include an azo pigment, a polycyclic pigment, a chelate dye, a nitro pigment, a nitroso pigment, and aniline black. Among these, an azo pigment and a polycyclic pigment are more preferable.

Examples of the inorganic pigment include titanium oxide, iron oxide, calcium carbonate, barium sulfate, aluminum hydroxide, barium yellow, cadmium red, chrome yellow, and carbon black.

Preferred examples of the colorant include the colorants described in paragraphs 0096 to 0100 of JP2009-241586A.

The content of the colorant is preferably in a range of 1% by mass to 25% by mass, more preferably in a range of 2% by mass to 20% by mass, still more preferably in a range of 5% by mass to 20% by mass, and particularly preferably in a range of 5% by mass to 15% by mass with respect to the total mass of the ink.

(Water)

The ink contains water.

The content of water is preferably 50% by mass or greater and more preferably 60% by mass or greater with respect to the total amount of the ink.

The upper limit of the water content depends on the amounts of other components such as the colorant, but is, for example, 90% by mass, preferably 85% by mass, and more preferably 80% by mass.

(Dispersant)

The ink may contain a dispersant for dispersing the colorant.

As the dispersant, any of a polymer dispersant or a low-molecular-weight surfactant-type dispersant may be used. Further, as the polymer dispersant, any of a water-soluble dispersant or a water-insoluble dispersant may be used.

Preferred examples of the dispersant include dispersants described in paragraphs 0080 to 0096 of JP2016-145312A.

The mixing mass ratio between a colorant (p) and a dispersant (s) (p:s) is preferably in a range of 1:0.06 to 1:3, more preferably in a range of 1:0.125 to 1:2, and still more preferably in a range of 1:0.125 to 1:1.5.

(Resin Particles)

It is preferable that the ink contains at least one kind of resin particles.

In a case where the ink contains resin particles, the fixing property of the ink to the impermeable base material and the rub resistance of the image can be further improved.

Further, the resin particles have a function of fixing the ink, that is, the image by being aggregated or destabilizing the dispersion and thickening the ink in a case of being brought into contact with the aggregating agent described above.

It is preferable that such resin particles are dispersed in water and a water-containing organic solvent.

Preferred examples of the resin particles include resin particles described in paragraphs 0062 to 0076 of JP2016-188345A.

(Water-Soluble Organic Solvent)

It is preferable that the ink contains at least one water-soluble organic solvent.

In a case where the ink contains a water-soluble organic solvent, the jettability of the ink from an ink jet head is further improved.

Examples of the water-soluble organic solvent include alcohols (such as methanol, ethanol, propanol, isopropanol, butanol, isobutanol, sec-butanol, t-butanol, pentanol, hexanol, cyclohexanol, and benzyl alcohol); polyhydric alcohols (such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol, 2-methyl-1,3-propanediol, 1,2,6-hexanetriol, an acetylene glycol derivative, and trimethylolpropane); glycol derivatives (such as ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether); amines (such as ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine); and other polar solvents (such as formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone).

(Other Additives)

The ink may contain components other than the components described above.

Examples of other components include a fading inhibitor, an emulsion stabilizer, a penetration enhancer, an ultraviolet absorbing agent, a preservative, a fungicide, a pH adjuster, a surface tension adjuster, an antifoaming agent, a viscosity adjuster, a dispersant other than those described above, a dispersion stabilizer, a rust inhibitor, and a chelating agent.

[Base Material for Image Recording]

A base material for image recording according to the embodiment of the present disclosure comprises an impermeable base material and a pretreatment layer which is disposed on at least one surface of the impermeable base material and contains the solid content of the above-described pretreatment liquid according to the embodiment of the present disclosure.

Here, the solid content of the pretreatment liquid indicates all the components obtained by excluding the solvent component (at least the aqueous medium) in the pretreatment liquid. That is, the solid content of the pretreatment liquid contains at least the specific resin and the aggregating agent.

An image with excellent adhesiveness to the impermeable base material can be recorded by applying the ink onto the pretreatment layer of the base material for image recording according to the embodiment of the present disclosure to record an image.

The base material for image recording according to the embodiment of the present disclosure can be suitably produced by, for example, the following method of producing the base material for image recording.

[Method of Producing Base Material for Image Recording]

As the method for producing the base material for image recording according to the embodiment of the present disclosure, a production method including a step of applying the above-described pretreatment liquid according to the embodiment of the present disclosure onto the impermeable base material (hereinafter, also referred to as a "pretreatment liquid application step") is exemplified.

The production method exemplified above may include other steps as necessary.

<Pretreatment Liquid Application Step>

The application of the pretreatment liquid in the pretreatment liquid application step can be performed by employing a known application method such as a coating method, an ink jet method, or an immersion method.

Examples of the coating method include known coating methods using a bar coater, an extrusion die coater, an air doctor coater, a blade coater, a rod coater, a knife coater, a squeeze coater, and a reverse roll coater.

The details of the ink jet method are the same as the details of the ink jet method in the image recording method described below.

The amount of the pretreatment liquid to be applied is not particularly limited as long as the ink can be aggregated, but the amount of the pretreatment liquid to be applied after being dried is set to be preferably 0.05 $g/m^2$ or greater and more preferably in a range of 0.05 $g/m^2$ to 1.0 $g/m^2$ from the viewpoints of enhancing the adhesiveness of the image and suppressing peeling of the image.

Further, the impermeable base material may be heated before the application of the pretreatment liquid.

The heating temperature may be appropriately set according to the kind of the impermeable base material and the composition of the pretreatment liquid, but the temperature of the impermeable base material is set to be preferably in a range of 30° C. to 70° C. and more preferably in a range of 30° C. to 60° C.

As the impermeable base material, an impermeable base material that has been subjected to a surface treatment in advance may be used.

Further, an impermeable base material may be subjected to a surface treatment before the application of the pretreatment liquid in the pretreatment application step, using an impermeable base material which has not been subjected to a surface treatment.

Specific examples of the surface treatment are as described above.

In the pretreatment liquid application step, the pretreatment liquid applied onto the impermeable base material may be heated and dried.

Examples of the means for heating and drying the pretreatment liquid include known heating means such as a heater, known air blowing means such as a dryer, and means for combining these.

Examples of the method of heating and drying the pretreatment liquid include a method of applying heat using a heater or the like from a side of the impermeable base material opposite to the surface onto which the pretreatment liquid has been applied; a method of applying warm air or hot air to the surface of the impermeable base material onto which the pretreatment liquid has been applied; a method of applying heat using an infrared heater from the surface of the impermeable base material onto which the pretreatment liquid has been applied or from a side of the impermeable base material opposite to the surface onto which the pretreatment liquid has been applied; and a method of combining a plurality of these methods.

The heating temperature of heating and drying the pretreatment liquid is preferably 35° C. or higher and more preferably 40° C. or higher.

The upper limit of the heating temperature is not particularly limited, and the upper limit thereof is preferably 100° C., more preferably 90° C., and still more preferably 70° C.

The time of heating and drying the pretreatment liquid is not particularly limited, but is preferably in a range of 0.5 seconds to 60 seconds, more preferably in a range of 0.5 seconds to 20 seconds, and particularly preferably in a range of 0.5 seconds to 10 seconds.

[Image Recording Material]

An image recording material according to the embodiment of the present disclosure comprises an impermeable base material, and an image which is disposed on at least one surface of the impermeable base material and contains the solid content (such as the specific resin and the aggregating agent) in the above-described pretreatment liquid according to the embodiment of the present disclosure and a colorant.

Since the image recording material according to the embodiment of the present disclosure comprises an image containing a specific resin, the adhesiveness between the image and the impermeable base material is excellent.

The image recording material according to the embodiment of the present disclosure can be suitably produced by, for example, the image recording method described below.

[Image Recording Method]

As the image recording method according to the embodiment of the present disclosure, an image recording method including a step of applying the above-described pretreatment liquid according to the embodiment of the present disclosure onto an impermeable base material, and a step of applying an ink containing a colorant and water on a surface of the impermeable base material onto which the pretreatment liquid has been applied to record an image is exemplified.

The image recording method exemplified above may include other steps as necessary.

The preferred embodiments of the step of applying the pretreatment liquid are the same as the preferred embodiments of the "pretreatment liquid application step" in the above-described example of the method of producing the base material for image recording.

<Image Recording Step>

The image recording step is a step of applying an ink containing a colorant and water onto a surface of the impermeable base material onto which the pretreatment liquid has been applied to record an image.

As the method of applying the ink in the image recording step, a known method such as a coating method, an ink jet method, or an immersion method can be employed.

Among these, an ink jet method is preferable.

The method of jetting the ink in the ink jet method is not particularly limited, and any of known methods such as an electric charge control method of jetting an ink using electrostatic attraction force; a drop-on-demand method (pressure pulse method) using a vibration pressure of a piezoelectric element; an acoustic ink jet method of jetting an ink using a radiation pressure by changing an electric signal into an acoustic beam and radiating the acoustic beam to the ink; and a thermal ink jet (bubble jet (registered trademark)) method of heating an ink to form bubbles and utilizing the generated pressure may be used.

As an ink jet method, particularly, an ink jet method, described in JP1979-059936A (JP-S54-059936A), of jetting an ink from a nozzle using an action force caused by a rapid change in volume of the ink after being subjected to an action of thermal energy can be effectively used.

Further, as an ink jet method, the method described in paragraphs 0093 to 0105 of JP2003-306623A can also be employed.

The application of the ink onto the impermeable base material according to the ink jet method can be performed by allowing the ink to be jetted from a nozzle of an ink jet head.

Examples of the system of the ink jet head include a shuttle system of performing recording while scanning a short serial head in the width direction of a recording medium and a line system of using a line head in which recording elements are aligned in correspondence with the entire area of one side of a recording medium.

In the line system, image recording can be performed on the entire surface of the recording medium by scanning the recording medium in a direction intersecting the direction in which the recording elements are aligned. In the line system, a transport system such as a carriage that scans a short head in the shuttle system is not necessary. Further, in the line system, since movement of a carriage and complicated scanning control between the head and the recording medium are not necessary as compared with the shuttle system, only the recording medium moves. Therefore, according to the line system, image recording at a higher speed than that of the shuttle system can be realized.

It is preferable that the application of the ink is performed using an ink jet head having a resolution of 300 dpi or greater (more preferably 600 dpi or greater and still more preferably 800 dpi or greater). Here, dpi stands for dot per inch, and 1 inch is 2.54 cm.

From the viewpoint of obtaining a high-definition image, the liquid droplet amount of the ink to be jetted from the nozzle of the ink jet head is preferably in a range of 1 pL (pico liter) to 10 pL and more preferably in a range of 1.5 pL to 6 pL.

Further, from the viewpoints of improving the image unevenness and improving connection of continuous gradations, it is also effective that the ink is jetted by combining different liquid droplet amounts.

In the image recording step, an image may be obtained by heating and drying the ink which has been applied onto the impermeable base material.

Examples of the means for heating and drying the ink include known heating means such as a heater, known air blowing means such as a dryer, and means for combining these.

Examples of the method for heating and drying the ink include a method of applying heat using a heater or the like from a side of the impermeable base material opposite to the surface onto which the ink has been applied; a method of applying warm air or hot air to the surface of the impermeable base material onto which the ink has been applied; a method of applying heat using an infrared heater from the surface of the impermeable base material onto which the ink has been applied or from a side of the impermeable base material opposite to the surface onto which the ink has been applied; and a method of combining a plurality of these methods.

The heating temperature of heating and drying the ink is preferably 55° C. or higher, more preferably 60° C. or higher, and particularly preferably 65° C. or higher. The upper limit of the heating temperature is not particularly limited, and the upper limit thereof may be 100° C. and preferably 90° C.

The time of heating and drying the ink is not particularly limited, but is preferably in a range of 3 seconds to 60 seconds, more preferably in a range of 5 seconds to 60 seconds, and particularly preferably in a range of 10 seconds to 45 seconds.

Further, the impermeable base material may be heated in advance before the application of the ink.

The heating temperature may be appropriately set, but the temperature of the impermeable base material is set to be preferably in a range of 20° C. to 50° C. and more preferably in a range of 25° C. to 40° C.

In the image recording step, inks of two or more colors may be applied onto the surface of the impermeable base material onto which the pretreatment liquid has been applied, and images of two or more colors may be recorded.

EXAMPLES

Hereinafter, examples of the present disclosure will be described, but the present disclosure is not limited to the following examples.

Further, "%" indicates % by mass unless otherwise specified.

In the description below, a structural unit (1) may be simply referred to as a "unit (1)". The same applies to other structural units.

<Synthesis of Specific Resin Used in Pretreatment Liquid of Example 1 (Hereinafter, Also Referred to as "Specific Resin 1")>

A specific resin 1 was synthesized in the following manner.

3.0 g of sodium dodecyl benzene sulfonate (62 mass % aqueous solution, manufactured by Tokyo Chemical Industry Co., Ltd.) and 376 g of water were added to a 1000 mL three-neck flask provided with a stirrer and a cooling pipe, and the solution was heated to 90° C. in a nitrogen atmosphere. A solution A obtained by dissolving 11.0 g of a 50 mass % aqueous solution of sodium 2-acrylamido-2-methylpropane sulfonate (manufactured by Sigma-Aldrich Co., LLC) in 20 g of water, a solution B obtained by mixing 12.5 g of 2-hydroxyethyl methacrylate (manufactured by FUJIFILM Wako Pure Chemical Corporation), 11.0 g of n-butyl methacrylate (manufactured by FUJIFILM Wako Pure Chemical Corporation), 11.0 g of 2-ethylhexyl methacrylate (manufactured by FUJIFILM Wako Pure Chemical Corporation), and 10.0 g of styrene (manufactured by FUJIFILM Wako Pure Chemical Corporation), and a solution C obtained by dissolving 6.0 g of sodium persulfate (manufactured by FUJIFILM Wako Pure Chemical Corporation) in 40 g of water were simultaneously added dropwise to the heated mixed solution in the three-neck flask for 3 hours. After the completion of the dropwise addition, the resulting solution was allowed to further react for 3 hours, thereby synthesizing 500 g of an aqueous dispersion liquid of the specific resin 1 (the solid content of the specific resin 1: 10.1% by mass).

The glass transition temperature of the specific resin 1 in the aqueous dispersion liquid was 28° C. Further, the weight-average molecular weight of the specific resin 1 was 52000.

<Synthesis of Specific Resins Used in Pretreatment Liquids of Examples 2 to 49>

The same operation as that for the synthesis of the specific resin 1 was performed except that the kind and the amount of the raw material monomer were changed so that the kind and the amount of each unit were changed as listed in Table 3.

<Synthesis of Synthetic Resin 1 Used in Pretreatment Liquid of Example 48>

A synthetic resin 1 (water-soluble resin) in Example 48 was obtained by performing the same operation as that for the synthesis of the specific resin 1 except that the kind and the amount of the raw material monomer were changed as described below. The weight-average molecular weight (Mw) of the synthetic resin 1 was 52000.

(Synthetic Resin 1)

AMPSNa

HEMA

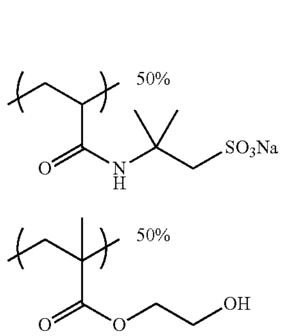

(Composition of each structural unit: 50% by mass of AMPSNa, 50% by mass of HEMA)

Further, as a water-soluble resin AT-210 of Example 49, JURYMER AT-210 (Toagosei Co., Ltd.) was used.

<Synthesis of Comparative Resins Used in Pretreatment Liquids of Comparative Examples 1 and 2>

The same operation as that for the synthesis of the specific resin 1 was performed except that the kind and the amount of the raw material monomer were changed so that the kind and the amount of each unit were changed as listed in Table 3.

In regard to each specific resin or each comparative resin, the total amount of units (1) to (3), the amount (%) of the C2 or more chain alkyl group unit, the weight-average molecular weight (Mw), the glass transition temperature (Tg), the HSP distance between the resin and the aqueous medium, and the HSP distance between the resin and the aggregating agent are listed in Table 4.

Here, the "C2 or more chain alkyl group unit" indicates a structural unit derived from an alkyl (meth)acrylate containing a chain alkyl group having 2 or more carbon atoms.

Further, the amount of each unit indicates the content (% by mass) of each unit with respect to the total amount of the resin.

Example 1

<Preparation of Pretreatment Liquid>

Respective components described in the "Composition of pretreatment liquid" below were mixed to prepare a pretreatment liquid.

—Composition of Pretreatment Liquid—

- Aqueous dispersion of specific resin 1: 10.0% by mass as amount of specific resin 1
- Malonic acid (aggregating agent): 5.0% by mass
- Propylene glycol (water-soluble organic solvent): 10.0% by mass
- Antifoaming agent (TSA-739 (15%), manufactured by Momentive Performance Materials Japan LLC, emulsion type silicone antifoaming agent): 0.01% by mass as amount of antifoaming agent
- Ion exchange water: remaining amount set such that total amount was 100/by mass —Composition of pretreatment liquid containing water-soluble resin (Examples 48 and 49)—

- Aqueous dispersion of specific resin: 10.0% by mass as amount of specific resin Propylene glycol (water-soluble organic solvent): 10.0% by mass
- Water-soluble resin: 1.0% by mass
- Antifoaming agent (TSA-739 (15%), manufactured by Momentive Performance Materials Japan LLC, emulsion type silicone antifoaming agent): 0.01% by mass as amount of antifoaming agent
- Ion exchange water: remaining amount set such that total amount was 100% by mass <Preparation of Ink>

Respective components described in the "Composition of ink" below were mixed to prepare an ink (specifically, cyan ink).

—Composition of Ink—

- Project Cyan APD1000 (manufactured by FUJIFILM Imaging Colorants Ltd., cyan pigment dispersion liquid, concentration of pigment: 12% by mass): 20% by mass
- Polymer particle aqueous dispersion shown below: 8% by mass
- Propylene glycol (water-soluble organic solvent): 20.0% by mass
- OLFINE E1010 (manufactured by Nissin Chemical Co., Ltd., surfactant): 1.0% by mass
- on exchange water: remaining amount set such that total amount was 100/by mass —Preparation of Polymer Particle Aqueous Dispersion—

A polymer particle aqueous dispersion was prepared in the following manner.

A 2 L three-neck flask provided with a stirrer, a thermometer, a reflux cooling pipe, and a nitrogen gas introduction pipe was charged with 560.0 g of methyl ethyl ketone, and the solution was heated to 87° C. Next, a mixed solution formed of 220.4 g of methyl methacrylate, 301.6 g of isobornyl methacrylate, 58.0 g of methacrylic acid, 108 g of methyl ethyl ketone, and 2.32 g of "V-601" (polymerization initiator, manufactured by FUJIFILM Wako Pure Chemical Corporation, dimethyl 2,2'-azobis(2-methyl propionate)) was added dropwise to the methyl ethyl ketone in the reaction container at a constant speed such that the dropwise addition was completed for 2 hours while the reflux state in the reaction container was maintained (hereinafter, the reflux state was maintained until the reaction was completed). After completion of the dropwise addition, the solution was stirred for 1 hour, and the operation of the following step (1) was performed on the solution after being stirred for 1 hour.

Step (1) . . . A solution formed of 1.16 g of "V-601" and 6.4 g of methyl ethyl ketone was added to the solution, and the resulting solution was stirred for 2 hours.

Next, the operation of the step (1) was repeatedly performed four times, a solution formed of 1.16 g of "V-601" and 6.4 g of methyl ethyl ketone was added to the solution, and the resulting solution was stirred for 3 hours (the operation carried out so far is referred to as the "reaction").

After completion of the reaction, the temperature of the solution was decreased to 65° C., 163.0 g of isopropanol was added to the solution, and the solution was allowed to be naturally cooled, thereby obtaining a polymerization solution (concentration of solid contents: 41.0%) containing a copolymer of methyl methacrylate, isobornyl methacrylate, and methacrylic acid (=38/52/10 [mass ratio]).

The weight-average molecular weight (Mw) of the copolymer was 63000, and the acid value thereof was 65.1 (mgKOH/g).

Next, 317.3 g (concentration of solid contents: 41.0%) of the obtained polymerization solution was weighed, 46.4 g of isopropanol, 1.65 g of a 20% maleic anhydride aqueous solution (water-soluble acidic compound, corresponding to 0.3% as maleic acid with respect to the copolymer), and 40.77 g of a 2 mol/L NaOH aqueous solution were added to the solution, and the temperature of the liquid in the reaction container was increased to 70° C.

Next, 380 g of distilled water was added dropwise to the solution, which had been heated to 70° C., at a speed of 10 ml/min, and water dispersion was performed (dispersion step).

Thereafter, a total amount of 287.0 g of isopropanol, methyl ethyl ketone, and distilled water was distilled off by maintaining the temperature of the liquid in the reaction container at 70° C. for 1.5 hours under reduced pressure (solvent removal step). 0.278 g (440 ppm as benzisothiazolin-3-one as the solid content of the polymer) of PROXEL GXL (S) (manufactured by Arch Chemicals, Inc.) was added to the obtained liquid.

The obtained liquid was filtered using a filter having a mesh diameter of 1 μm, and the filtrate was collected, thereby obtaining a polymer particle aqueous dispersion whose concentration of solid contents was 26.5%.

<Image Recording>

An ink jet recording device comprising a transport system for continuously transporting a long impermeable base material, a wire bar coater for coating the impermeable base material with a pretreatment liquid, and an ink jet head for applying an ink to a surface of the impermeable base material onto which the pretreatment liquid had been applied was prepared.

Further, as the impermeable base material, a polyethylene terephthalate (PET) base material ("FE2001", manufactured by Futamura Chemical Co., Ltd., (thickness of 25 μm, width of 500 mm, length of 2000 m), hereinafter, referred to as an "impermeable base material A") was prepared.

A solid image of cyan color was recorded in the following manner while the impermeable base material A was continuously transported at 635 mm/sec using an ink jet recording device.

The impermeable base material A was coated with the pretreatment liquid using a wire bar coater such that the mass of the pretreatment liquid to be applied reached approximately 1.7 $g/m^2$, and the pretreatment liquid was dried at 50° C. for 2 seconds.

Next, the ink was applied to the surface of the impermeable base material A onto which the pretreatment liquid had been applied in the form of a solid image under the following application conditions, and the applied ink was dried at 80° C. for 30 seconds, thereby recording a solid image of cyan color.

Both the method of drying the pretreatment liquid and the method of drying the ink were warm air drying.

—Ink Application Conditions—

Ink jet head: 1200 dpi/20-inch width piezo full line head (here, dpi stands for dot per inch, and 1 inch is 2.54 cm.)

Ink jet amount from ink jet head: 4.0 μL

Driving frequency: 30 kHz (transport speed of base material: 635 mm/sec)

<Evaluation of Adhesiveness>

Next, the adhesiveness of the image was evaluated by attaching a piece of Cellotape (registered trademark, No. 405, manufactured by Nichiban Co., Ltd., width of 12 mm, hereinafter, also simply referred to as "tape") onto the solid image after 1 minute from the recording of the solid image (that is, drying of the solid image at 80° C. for 30 seconds) and peeling the piece of tape off from the solid image.

Specifically, the tape was attached and peeled off according to the following method.

The tape was taken out at a constant speed and cut to have a length of approximately 75 mm, thereby obtaining a piece of tape.

The obtained piece of tape was superimposed on the solid image, and a region at the central portion of the piece of tape with a width of 12 mm and a length of 25 mm was attached onto the image using a finger and rubbed firmly with a fingertip. Here, in the solid image, the region with a width of 12 mm and a length of 25 mm to which a piece of tape was attached is hereinafter referred to as an "evaluation region".

An end of the piece of tape was grasped in 5 minutes after the piece of tape was attached onto the image and was peeled off from the image at an angle of approximately 60° for 0.5 to 1.0 seconds.

Next, the area ratio (%) of the image remaining on the impermeable base material with respect to the entire evaluation region of the solid image was acquired, and the adhesiveness of the image was evaluated based on the following evaluation standards.

The results are listed in Table 4.

In the following evaluation standards, the rank with the most excellent adhesiveness of the image is set as "A".

—Evaluation Standards for Adhesiveness of Image—

A: The area ratio (%) of the image remaining on the impermeable base material was in a range of 90% to 100%.

B: The area ratio (%) of the image remaining on the impermeable base material was 70% or greater and less than 90%.

C: The area ratio (%) of the image remaining on the impermeable base material was 50% or greater and less than 70%.

D: The area ratio (%) of the image remaining on the impermeable base material was 30% or greater and less than 50%.

E: The area ratio (%) of the image remaining on the impermeable base material was less than 30%.

<Evaluation of Streak Unevenness of Image>

A region having a size of 50 mm (the transport direction of the impermeable base material)×20 mm (a direction orthogonal to the transport direction of the impermeable base material) in the solid image was set as a "streak unevenness evaluation region".

The streak unevenness evaluation region in the solid image was visually observed, the presence or absence of streak unevenness in parallel with the transport direction of the impermeable base material and the degree of the occurrence of the streak unevenness were confirmed, and the streak unevenness of the image was evaluated based on the following evaluation standards.

The results are listed in Table 4.

In the following evaluation standards, the rank in which the streak unevenness of the image was most suppressed is set as "A".

Further, in the following evaluation standards, the streak unevenness which was able to be easily visually recognized indicates streak unevenness that was able to be visually recognized in a case of being observed at a position separated by 50 cm.

—Evaluation Standards for Streak Unevenness of Image—

A: The occurrence of streak unevenness was not visually recognized in the solid image.

B: One extremely thin streak was visually recognized in the solid image, and streak unevenness which was able to be easily visually recognized was not confirmed.

C: Several extremely thin streaks were visually recognized in the solid image, and streak unevenness which was able to be easily visually recognized was not confirmed.

D: Streak unevenness which was able to be easily visually recognized was confirmed in the solid image.

<Evaluation of Temporal Stability of Pretreatment Liquid>

25 g of the above-described treatment liquid was accommodated in a 30 mL polyethylene bottle. The bottle in which the pretreatment liquid was accommodated was placed in a thermocell whose temperature was set to 40° C. and stored for 2 weeks. The viscosities of the pretreatment liquid before and after the storage were respectively measured, and Δ viscosity (mPa·s) was calculated according to the following equation.

Δ Viscosity=(Viscosity of pretreatment liquid after storage at 40° C. for 2 weeks)−(viscosity of pretreatment liquid before storage)

Further, the viscosity was measured in a state where the temperature of the pretreatment liquid was adjusted to 25° C. using a VISCOMETER TV-22 (manufactured by Toki Sangyo Co., Ltd.).

Based on Δ viscosity obtained in the above-described manner, the temporal stability of the pretreatment liquid was evaluated based on the following evaluation standards.

The results are listed in Table 4.

In the following evaluation standards, the rank in which the temporal stability of the pretreatment liquid was most excellent is set as "A".

—Evaluation Standards for Temporal Stability of Pretreatment Liquid—

5: The Δ viscosity was 0.1 mPa·s or less.

4: The Δ viscosity was greater than 0.1 mPa·s and 0.4 mPa·s or less.

3: The Δ viscosity was greater than 0.4 mPa·s and 1.0 mPa·s or less.

2: The Δ viscosity was greater than 1.0 mPa·s and 2.0 mPa·s or less.

1: The Δ viscosity was greater than 2.0 mPa·s.

Examples 2 to 28, 32 to 35, and 44 to 47

The same operation as in Example 1 was performed except that the specific resin in the pretreatment liquid was changed to the specific resins listed in Tables 3 and 4.

The results are listed in Table 4.

Examples 29 to 31

The same operation as in Example 28 was performed except that the impermeable base material A (PET base material) was changed to the following impermeable base materials B to D.

The results are listed in Table 4.

Impermeable base material B: biaxially stretched polypropylene (OPP) base material ("P6181", manufactured by Toyobo Co., Ltd., thickness of 25 μm, width of 500 mm, length of 2000 m)

Impermeable base material C: nylon base material ("EMBLEM ON-25", manufactured by Unitika Ltd., thickness of 25 μm, width of 500 mm, length of 2000 m)

Impermeable base material D: polyethylene base material ("LL-RP2", manufactured by Futamura Chemical Co., Ltd., thickness of 30 μm, width of 500 mm, length of 2000 m)

Examples 36 to 39

The same operation as in Example 28 was performed except that the amount of the aggregating agent in the pretreatment liquid was changed as listed in Table 4.

The results are listed in Table 4.

Examples 40 and 41

The same operation as in Example 28 was performed except that the kind of the aggregating agent in the pretreatment liquid was changed as listed in Table 4.

The results are listed in Table 4.

Examples 42 and 43

The same operation as in Example 1 was performed except that the specific resin in the pretreatment liquid was changed to the specific resins listed in Tables 3 and 4 and the kind of the aggregating agent in the pretreatment liquid was changed as listed in Table 4.

The results are listed in Table 4.

TABLE 3

| | Specific resin or comparative resin ("amount" is amount (% by mass) with respect to entirety of resin) | | | | | | | | | |
|---|---|---|---|---|---|---|---|---|---|---|
| | Unit (1) | | Unit (2) | | | | Unit (3) | | Unit (A) | |
| | Kind | Amount | Kind | Amount | Kind | Amount | Kind | Amount | Kind | Amount |
| Example 1 | | | HEMA | 25 | | | | | St | 20 |
| Example 2 | ACMO | 25 | 2MEA | 12 | | | | | St | 24 |
| Example 3 | ACMO | 20 | 2MEA | 20 | | | | | St | 27 |
| Example 4 | DAAM | 25 | 2MEA | 20 | | | | | St | 10 |
| Example 5 | | | 2MEA | 23 | HEMA | 20 | | | St | 20 |
| Example 6 | | | 2MEA | 45 | HEMA | 40 | | | St | 5 |
| Example 7 | | | HEMA | 3 | | | | | St | 15 |
| Example 8 | | | HEMA | 8 | | | | | St | 10 |
| Example 9 | | | 2MEA | 40 | HEMA | 25 | | | St | 5 |
| Example 10 | | | HEMA | 13 | | | | | St | 10 |
| Example 11 | | | 2MEA | 35 | HEMA | 20 | | | St | 10 |
| Example 12 | | | 2MEA | 41 | | | | | St | 10 |
| Example 13 | | | | | | | MAAm | 15 | St | 37 |
| Example 14 | | | HEMA | 24 | | | | | St | 65 |
| Example 15 | | | HEMA | 34 | | | | | St | 39 |
| Example 16 | DMAAm | 20 | | | | | | | St | 10 |
| Example 17 | ACMO | 21 | | | | | | | | |
| Example 18 | | | EOEOEA | 40 | HEMA | 10 | | | St | 10 |
| Example 19 | | | EOEOEA | 35 | HEA | 10 | | | St | 5 |
| Example 20 | | | DMAEA | 30 | HBA | 15 | | | St | 5 |
| Example 21 | | | EOEOEA | 40 | HEMA | 10 | | | St | 10 |
| Example 22 | | | EOEOEA | 40 | HEMA | 10 | | | St | 10 |

TABLE 3-continued

| | Specific resin or comparative resin (“amount” is amount (% by mass) with respect to entirety of resin) | | | | | | | | | |
|---|---|---|---|---|---|---|---|---|---|---|
| Example 23 | HEAAm | 10 | 2MEA | 20 | | | | | St | 30 |
| Example 24 | | | 2MEA | 30 | GLmMA | 20 | | | | |
| Example 25 | | | 2MEA | 30 | HEMA | 20 | | | | |
| Example 26 | NIPAM | 20 | | | | | | | | |
| Example 27 | | | 2MEA | 35 | HEMA | 8 | | | St | 37 |
| Example 28 | | | HEMA | 25 | EOEOEA | 10 | | | St | 20 |
| Example 29 | | | HEMA | 25 | EOEOEA | 10 | | | St | 20 |
| Example 30 | | | HEMA | 25 | EOEOEA | 10 | | | St | 20 |
| Example 31 | | | HEMA | 25 | EOEOEA | 10 | | | St | 20 |
| Example 32 | | | HEMA | 25 | EOEOEA | 10 | | | St. | 20 |
| Example 33 | HEAAm | 20 | EOEOEA | 20 | | | | | St | 7 |
| Example 34 | | | EOEOEA | 20 | HEMA | 10 | | | | |
| Example 35 | | | HEMA | 25 | EOEOEA | 21 | | | St | 20 |
| Example 36 | | | HEMA | 25 | EOEOEA | 10 | | | St | 20 |
| Example 37 | | | HEMA | 25 | EOEOEA | 10 | | | St | 20 |
| Example 38 | | | HEMA | 25 | EOEOEA | 10 | | | St | 20 |
| Example 39 | | | HEMA | 25 | EOEOEA | 10 | | | St | 20 |
| Example 40 | | | HEMA | 25 | EOEOEA | 10 | | | St | 20 |
| Example 41 | | | HEMA | 25 | EOEOEA | 10 | | | St | 20 |
| Example 42 | | | 2MEA | 45 | HEMA | 40 | | | St | 5 |
| Example 43 | | | HEMA | 3 | | | | | St | 15 |
| Example 44 | | | HEMA | 25 | | | | | St | 3 |
| Example 45 | | | HEMA | 25 | | | | | St | 6 |
| Example 46 | | | HEMA | 20 | EOEOEA | 27 | | | St | 30 |
| Example 47 | | | HEMA | 25 | | | | | St | 5 |
| Example 48 | | | HEMA | 25 | EOEOEA | 10 | | | St | 20 |
| Example 49 | | | HEMA | 25 | EOEOEA | 10 | | | St | 20 |
| Comparative Example 1 | | | HEMA | 10 | | | | | St | 30 |
| Comparative Example2 | | | | | | | | | St | 20 |

| | Unit (B) | | Units (C) to (F) | | Unit (4) | | Other units | | | |
|---|---|---|---|---|---|---|---|---|---|---|
| | Kind | Amount | Kind | Amount | Kind | Amount | Kind | Amount | Kind | Amount |
| Example 1 | | | | | AMPSNa | 11 | nBMA | 22 | 2EHMA | 22 |
| Example 2 | | | | | AMPSNa | 5 | nBMA | 34 | | |
| Example 3 | | | | | AMPSNa | 5 | 2EHMA | 28 | | |
| Example 4 | | | | | AMPSNa | 11 | nBMA | 34 | | |
| Example 5 | | | | | AMPSNa | 5 | nBMA | 32 | | |
| Example 6 | | | | | AMPSNa | 5 | MMA | 5 | | |
| Example 7 | BzA | 37 | | | AMPSNa | 5 | nBMA | 40 | | |
| Example 8 | BzMA | 30 | | | AMPSNa | 5 | nBMA | 47 | | |
| Example 9 | | | | | AMPSNa | 5 | MMA | 25 | | |
| Example 10 | | | | | AMPSNa | 5 | nBA | 42 | MMA | 30 |
| Example 11 | | | | | AMPSNa | 5 | MMA | 30 | | |
| Example 12 | | | | | AMPSNa | 5 | MMA | 44 | | |
| Example 13 | | | | | AMPSNa | 5 | MMA | 43 | | |
| Example 14 | | | | | AMPSNa | 11 | | | | |
| Example 15 | | | | | AMPSNa | 11 | MMA | 16 | | |
| Example 16 | | | | | AMPSNa | 5 | nBA | 35 | MMA | 30 |
| Example 17 | BzMA | 27 | | | AMPSNa | 5 | nBMA | 47 | | |
| Example 18 | | | | | AMPSNa | 5 | nBA | 35 | | |
| Example 19 | | | | | AMPSNa | 5 | 2EHMA | 45 | | |
| Example 20 | | | | | AMPSNa | 5 | 2EHMA | 45 | | |
| Example 21 | | | | | AMPSNa | 5 | nBA | 20 | MMA | |
| Example 22 | | | | | AMPSNa | 5 | MMA | 20 | nBA | 15 |
| Example 23 | | | | | AMPSNa | 10 | MMA | 30 | | |
| Example 24 | BzMA | 20 | | | AMPSNa | 10 | MMA | 20 | | |
| Example 25 | BzMA | 10 | CyHMA | 10 | AMPSNa | 10 | MMA | 20 | | |
| Example 26 | | | IBOMA | 20 | AMPSNa | 5 | EMA | 55 | | |
| Example 27 | | | | | AMPSNa | 10 | MAA | 10 | | |
| Example 28 | BzA | 34 | | | AMPSNa | 11 | | | | |
| Example 29 | BzA | 34 | | | AMPSNa | 11 | | | | |
| Example 30 | BzA | 34 | | | AMPSNa | 11 | | | | |
| Example 31 | BzA | 34 | | | AMPSNa | 11 | | | | |
| Example 32 | PhOEA | 34 | | | AMPSNa | 11 | | | | |
| Example 33 | BzA | 42 | | | AMPSNa | 11 | | | | |
| Example 34 | | | | | AMPSNa | 11 | nBMA | 39 | MMA | 20 |
| Example 35 | BzA | 34 | | | | | | | | |
| Example 36 | BzA | 34 | | | AMPSNa | 11 | | | | |
| Example 37 | BzA | 34 | | | AMPSNa | 11 | | | | |
| Example 38 | BzA | 34 | | | AMPSNa | 11 | | | | |
| Example 39 | BzA | 34 | | | AMPSNa | 11 | | | | |
| Example 40 | BzA | 34 | | | AMPSNa | 11 | | | | |
| Example 41 | BzA | 34 | | | AMPSNa | 11 | | | | |
| Example 42 | | | | | AMPSNa | 5 | MMA | 5 | | |

TABLE 3-continued

| | Specific resin or comparative resin ("amount" is amount (% by mass) with respect to entirety of resin) | | | | | | | | | |
|---|---|---|---|---|---|---|---|---|---|---|
| Example 43 | BzA | 37 | | | AMPSNa | 5 | nBMA | 40 | | |
| Example 44 | BzA | 54 | | | AMPSNa | 11 | EMA | 7 | | |
| Example 45 | BzA | 54 | | | AMPSNa | 11 | EMA | 4 | | |
| Example 46 | | | DCPA | 12 | AMPSNa | 11 | | | | |
| Example 47 | | | DCPEOEA | 59 | AMPSNa | 11 | | | | |
| Example 48 | BzA | 34 | | | AMPSNa | 11 | | | | |
| Example 49 | BzA | 34 | | | AMPSNa | 11 | | | | |
| Comparative Example 1 | | | | | AMPSNa | 10 | MMA | 50 | | |
| Comparative Example2 | | | | | | | nBA | 73 | MMA | 7 |

TABLE 4

| | Pretreatment liquid | | | | | | |
|---|---|---|---|---|---|---|---|
| | | Aggregating agent | | | | | |
| | | | | Content | Specific resin or comparative resin | | |
| | Impermeable base material | Kind | Content [%] | mass ratio [resin/ aggregating agent] | Content of units (1) to (3) (%) | Amount of C2 or more chain alkyl group unit (%) | Mw |
| Example 1 | A | Malonic acid | 5 | 2.0 | 25 | 44 | 52000 |
| Example 2 | A | Malonic acid | 5 | 2.0 | 37 | 34 | 76000 |
| Example 3 | A | Malonic acid | 5 | 2.0 | 40 | 28 | 41000 |
| Example 4 | A | Malonic acid | 5 | 2.0 | 45 | 34 | 69000 |
| Example 5 | A | Malonic acid. | 5 | 2.0 | 43 | 32 | 82000 |
| Example 6 | A | Malonic acid | 5 | 2.0 | 85 | 0 | 37000 |
| Example 7 | A | Malonic acid | 5 | 2.0 | 3 | 40 | 123000 |
| Example 8 | A | Malonic acid | 5 | 2.0 | 8 | 47 | 86000 |
| Example 9 | A | Malonic acid | 5 | 2.0 | 65 | 0 | 37000 |
| Example 10 | A | Malonic acid | 5 | 2.0 | 13 | 42 | 58000 |
| Example 11 | A | Malonic acid | 5 | 2.0 | 55 | 0 | 46000 |
| Example 12 | A | Malonic acid | 5 | 2.0 | 41 | 0 | 51000 |
| Example 13 | A | Malonic acid | 5 | 2.0 | 15 | 0 | 32000 |
| Example 14 | A | Malonic acid | 5 | 2.0 | 24 | 0 | 81000 |
| Example 15 | A | Malonic acid | 5 | 2.0 | 34 | 0 | 78000 |
| Example 16 | A | Malonic acid | 5 | 2.0 | 20 | 35 | 39000 |
| Example 17 | A | Malonic acid | 5 | 2.0 | 21 | 47 | 46000 |
| Example 18 | A | Malonic acid | 5 | 2.0 | 50 | 35 | 51000 |
| Example 19 | A | Malonic acid | 5 | 2.0 | 45 | 45 | 83000 |
| Example 20 | A | Malonic acid | 5 | 2.0 | 45 | 45 | 49000 |
| Example 21 | A | Malonic acid | 5 | 2.0 | 50 | 20 | 54000 |
| Example 22 | A | Malonic acid | 5 | 2.0 | 50 | 15 | 61000 |
| Example 23 | A | Malonic acid | 5 | 2.0 | 30 | 0 | 89000 |
| Example 24 | A | Malonic acid | 5 | 2.0 | 50 | 0 | 46000 |
| Example 25 | A | Malonic acid | 5 | 2.0 | 50 | 0 | 84000 |
| Example 26 | A | Malonic acid. | 5 | 2.0 | 20 | 55 | 52000 |
| Example 27 | A | Malonic acid | 5 | 2.0 | 43 | 0 | 69000 |
| Example 28 | A | Malonic acid | 5 | 2.0 | 35 | 0 | 115000 |
| Example 29 | B | Malonic acid | 5 | 2.0 | 35 | 0 | 167000 |
| Example 30 | C | Malonic acid | 5 | 2.0 | 35 | 0 | 151000 |
| Example 31 | D | Malonic acid | 5 | 2.0 | 35 | 0 | 169000 |
| Example 32 | A | Malonic acid | 5 | 2.0 | 35 | 0 | 105000 |
| Example 33 | A | Malonic acid | 5 | 2.0 | 40 | 0 | 137000 |
| Example 34 | A | Malonic acid | 5 | 2.0 | 30 | 39 | 84000 |
| Example 35 | A | Malonic acid | 5 | 2.0 | 46 | 0 | 106000 |
| Example 36 | A | Malonic acid | 1 | 10.0 | 35 | 0 | 172000 |
| Example 37 | A | Malonic acid | 10 | 1.0 | 35 | 0 | 181000 |
| Example 38 | A | Malonic acid | 12 | 0.8 | 35 | 0 | 117000 |
| Example 39 | A | Malonic acid | 20 | 0.5 | 35 | 0 | 124000 |
| Example 40 | A | Methacrylic acid | 5 | 2.0 | 35 | 0 | 168000 |
| Example 41 | A | Tartaric acid | 5 | 2.0 | 35 | 0 | 153000 |
| Example 42 | A | Methacrylic acid | 5 | 2.0 | 85 | 0 | 54000 |
| Example 43 | A | Tartaric acid | 5 | 2.0 | 3 | 40 | 92000 |
| Example 44 | A | Malonic acid | 5 | 2.0 | 25 | 7 | 143000 |
| Example 45 | A | Malonic acid | 5 | 2.0 | 25 | 4 | 149000 |
| Example 46 | A | Malonic acid | 5 | 2.0 | 47 | 0 | 82000 |
| Example 47 | A | Malonic acid | 5 | 2.0 | 25 | 0 | 97000 |

TABLE 4-continued

| | | | | | | | |
|---|---|---|---|---|---|---|---|
| Example 48 | A | Malonic acid | 5 | 2.0 | 35 | 0 | 115000 |
| Example 49 | A | Malonic acid | 5 | 2.0 | | 0 | 115000 |
| Comparative Example 1 | A | Malonic acid | 5 | 2.0 | 10 | 0 | 38000 |
| Comparative Example2 | A | Malonic acid | 5 | 2.0 | 0 | 73 | 46000 |

| | Pretreatment liquid | | | | | | |
|---|---|---|---|---|---|---|---|
| | Specific resin or comparative resin | | | | Evaluation results | | |
| | Tg (° C.) | HSP distance between resin and aqueous medium | HSP distance between resin and aggregating agent | Water-soluble resin | Adhesiveness of image | Streak unevenness of image | Temporal stability of pretreatment liquid |
| Example 1 | 28 | 36.6 | 20.8 | Not available | A | C | A |
| Example 2 | 26 | 37.3 | 21.3 | Not available | A | C | B |
| Example 3 | 27 | 37.4 | 21.4 | Not available | A | C | B |
| Example 4 | 24 | 36.7 | 20.9 | Not available | A | C | A |
| Example 5 | 25 | 36.4 | 20.7 | Not available | A | C | A |
| Example 6 | 10 | 33.1 | 17.3 | Not available | D | A | B |
| Example 7 | 29 | 38.5 | 22.7 | Not available | D | C | B |
| Example 8 | 26 | 38.4 | 22.6 | Not available | C | C | B |
| Example 9 | 18 | 34.8 | 19.1 | Not available | C | A | B |
| Example 10 | 15 | 39.1 | 21.4 | Not available | B | C | B |
| Example 11 | 27 | 35.6 | 19.9 | Not available | B | A | B |
| Example 12 | 24 | 37.1 | 21.5 | Not available | A | A | B |
| Example 13 | 95 | 37.6 | 21.7 | Not available | D | A | C |
| Example 14 | 94 | 38.1 | 22.7 | Not available | D | A | A |
| Example 15 | 88 | 36.4 | 20.5 | Not available | C | A | A |
| Example 16 | 62 | 36.9 | 21.1 | Not available | C | C | B |
| Example 17 | 35 | 36.4 | 20.5 | Not available | B | C | B |
| Example 18 | −35 | 36.2 | 20.4 | Not available | D | C | C |
| Example 19 | −22 | 35.9 | 20.2 | Not available | D | C | B |
| Example 20 | −18 | 36.7 | 21.1 | Not available | C | C | B |
| Example 21 | −14 | 36.4 | 20.7 | Not available | C | C | B |
| Example 22 | −5 | 36.5 | 20.8 | Not available | B | C | B |
| Example 23 | 59 | 36.2 | 20.3 | Not available | B | A | A |
| Example 24 | 28 | 34.4 | 18.6 | Not available | A | A | A |
| Example 25 | 28 | 35.1 | 19.4 | Not available | A | A | A |
| Example 26 | 64 | 37.6 | 21.9 | Not available | C | C | B |
| Example 27 | 25 | 36.1 | 20.3 | Not available | A | A | A |
| Example 28 | 26 | 35.7 | 19.7 | Not available | A | A | A |
| Example 29 | 26 | 35.7 | 19.7 | Not available | A | A | A |
| Example 30 | 26 | 35.7 | 19.7 | Not available | A | A | A |
| Example 31 | 26 | 35.7 | 19.7 | Not available | A | A | A |
| Example 32 | 23 | 35.2 | 19.2 | Not available | A | A | A |
| Example 33 | 18 | 32.1 | 15.9 | Not available | C | A | A |
| Example 34 | 25 | 36.8 | 21.2 | Not available | D | C | A |
| Example 35 | 20 | 36.0 | 20.1 | Not available | A | A | D |
| Example 36 | 26 | 35.7 | 19.7 | Not available | A | A | A |
| Example 37 | 26 | 35.7 | 19.7 | Not available | A | A | A |
| Example 38 | 26 | 35.7 | 19.7 | Not available | B | A | A |
| Example 39 | 26 | 35.7 | 19.7 | Not available | B | A | A |
| Example 40 | 26 | 35.7 | 6.5 | Not available | A | A | A |
| Example 41 | 26 | 35.7 | 25.0 | Not available | A | A | A |
| Example 42 | 10 | 33.1 | 4.4 | Not available | D | A | B |
| Example 43 | 29 | 38.5 | 28.1 | Not available | D | C | B |
| Example 44 | 25 | 35.0 | 19.0 | Not available | A | B | A |
| Example 45 | 26 | 35.1 | 19.1 | Not available | A | A | A |
| Example 46 | 26 | 36.5 | 20.6 | Not available | A | A | A |
| Example 47 | 27 | 34.7 | 18.8 | Not available | A | A | A |
| Example 48 | 26 | 35.7 | 19.7 | Synthetic resin 1 | A | A | A |
| Example 49 | 26 | 35.7 | 19.7 | AT-210 | A | A | A |
| Comparative Example 1 | 100 | 38.1 | 22.3 | Not available | E | A | A |
| Comparative Example2 | 31 | 38.4 | 22.7 | Not available | E | D | E |

As listed in Tables 3 and 4, the adhesiveness of the image was excellent in Examples 1 to 49 in which the pretreatment liquid containing an aggregating agent, an aqueous medium, and a specific resin, having the specific resin that had at least one selected from the group consisting of the units (1) to (3), and having the specific resin with a glass transition temperature of −40° C. or higher and lower than 100° C. was used.

On the contrary, the adhesiveness of the image was degraded in Comparative Example 1 in which the pretreatment liquid containing a comparative resin with a glass transition temperature of 100° C. was used.

Further, the adhesiveness of the image was degraded even in Comparative Example 2 in which the pretreatment liquid containing a comparative resin having none of the units (1) to (3) was used.

As shown in the results of Examples 27 to 34, it was found that in a case where the specific resin further had at least one selected from the group consisting of the units (A) to (E) (Examples 27 to 33), the adhesiveness of the image was further improved.

As shown in the results of Examples 22 to 26, it was found that in a case where the specific resin had at least one selected from the group consisting of the units (A) and (B) (Examples 22 to 25), the adhesiveness of the image was further improved.

As shown in the results of Examples 6 to 9, it was found that in a case where the total content of the units (1) to (3) was in a range of 5% by mass to 80% by mass with respect to the entirety of the specific resin (Examples 8 and 9), the adhesiveness of the image was further improved.

As shown in the results of Examples 8 to 11, it was found that in a case where the total content of the units (1) to (3) was in a range of 10% by mass to 60% by mass with respect to the entirety of the specific resin (Examples 10 and 11), the adhesiveness of the image was further improved.

As shown in the results of Examples 1 to 13, it was found that in a case where the specific resin had at least one selected from the group consisting of the units (1) and (2) (Examples 1 to 12), the temporal stability of the pretreatment liquid was further improved.

As shown in the results of Examples 13 to 25, it was found that in a case where the glass transition temperature (Tg) of the specific resin was in a range of −20° C. to 90° C. (Examples 15 to 17 and 20 to 25), the adhesiveness of the image was further improved.

As shown in the results of Examples 13 to 25, it was found that in a case where the glass transition temperature (Tg) of the specific resin was in a range of −10° C. to 60° C. (Examples 17 and 22 to 25), the adhesiveness of the image was further improved.

As shown in the results of all the examples, it was found that in a case where the specific resin further had the unit (4) (Examples 1 to 34 and 36 to 49), the temporal stability of the pretreatment liquid was further improved.

As shown in the results of all the examples, it was found that in a case where the specific resin did not have the C2 or more chain alkyl group unit (that is, the structural unit derived from an alkyl (meth)acrylate containing a chain alkyl group having 2 or more carbon atoms with respect to the total amount of the specific resin) or in a case where the specific resin had the C2 or more chain alkyl group unit and the content of the C2 or more chain alkyl group unit was less than 5% by mass with respect to the total amount of the specific resin (Examples 6, 9, 11 to 15, 23 to 25, 27 to 33, 35 to 42, and 45 to 49), the streak unevenness of the image was further suppressed.

As shown in the results of Examples 6 and 33, it was found that in a case where the HSP distance between the specific resin and the aqueous medium (that is, the distance between Hansen solubility parameters) was in a range of 33 $MPa^{1/2}$ to 40 $MPa^{1/2}$ (Example 6), the adhesiveness of the image was further improved.

As shown in the results of Examples 28 and 36 to 39, it was found that in a case where the content mass ratio [specific resin/aggregating agent] was in a range of 1.0 to 10 (Examples 28, 36, and 37), the adhesiveness of the image was further improved.

As described above, the example group using the cyan ink as the ink has been described. However, it goes without saying that the same effects as those of the above-described example group can be obtained even in a case where the cyan ink was changed to an ink other than the cyan ink (for example, magenta ink, yellow ink, or black ink) in the example group or in a case where a multicolor image was recorded using the cyan ink and at least one ink other than the cyan ink.

What is claimed is:

1. A pretreatment liquid to be used for a pretreatment that is performed on an impermeable base material before an image is recorded on the impermeable base material, the pretreatment liquid comprising:

an aggregating agent;

a resin; and an aqueous medium, wherein the resin has at least one selected from the group consisting of a structural unit (1), a structural unit (2), and a structural unit (3), and the resin further has at least one selected from the group consisting of a structural unit (A), a structural unit (B), a structural unit (C), a structural unit (D), a structural unit (E), and a structural unit (F)

a glass transition temperature of the resin is −40° C. or higher and lower than 100° C., (1)

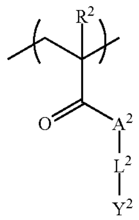

(2)

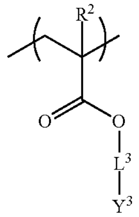

(3)

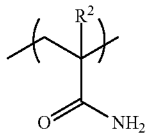

in the structural unit (1), the structural unit (2), and the structural unit (3), $R^2$ represents a hydrogen atom or an alkyl group having 1 to 4 carbon atoms, in the structural unit (1), $A^2$ represents —NH— or —N($L^4$-$Y^4$)—, $L^2$ represents a divalent group which is one selected from the first group consisting of an alkylene group, an alkenylene group, an alkynylene group, an arylene group, —O—, —NH—, —N($L^4$-$Y^4$)—, and —C(═O)—, a divalent group which is obtained by combining two or more selected from the first group, or a single bond, $Y^2$ represents an alkyl group, an alkenyl group, an alkynyl group, an aryl group, a halogen atom, —OH, —$OR^3$, —$NH_2$, —$NR^3H$, —$NR^3R^4$, or —C(═O)$R^3$, and two of $A^2$, $L^2$ and $Y^2$ may be linked to each other to form a ring, in the structural unit (2), $L^3$ represents a divalent group which is one selected from the first group or a divalent group which is obtained by combining two or more selected from the first group, $Y^3$ represents a halogen atom, —OH, —$NH_2$, —$NR^3H$, —$NR^3R^4$, or —C(═O)$R^3$, and $L^3$ and $Y^3$ may be linked to each other to form a ring, in the structural unit (1) and the structural unit (2), $L^4$ represents a divalent group which is one selected from the second group consisting of an alkylene group, an alkenylene group, an alkynylene group, an arylene group, —O—, —NH—, and —C(═O)—, a divalent group which is obtained by combining two or more selected from the second group, or a single bond, $Y^4$ represents an alkyl group, an alkenyl group, an alkynyl group, an aryl group, a halogen atom, —OH, —$OR^3$, —$NH_2$, —$NR^3H$, —$NR^3R^4$, or —C(═O)$R^3$, and $R^3$ and $R^4$ each independently represent an alkyl group, an alkenyl group, an alkynyl group, or an aryl group, and in the structural unit (1) and the structural unit (2), $L^4$ and $Y^4$ in —N($L^4$-$Y^4$)— may be linked to each other to form a ring, and $R^3$ and $R^4$ in —$NR^3R^4$ may be linked to each other to form a ring, (A)

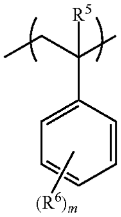

(B)

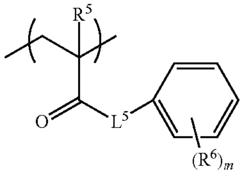

(C)

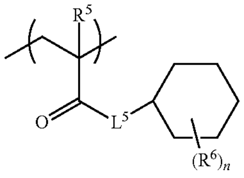

(D)

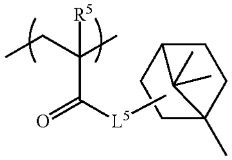

-continued (E)

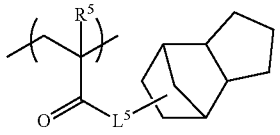

(F)

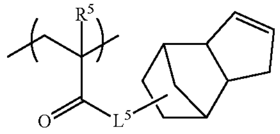

in the structural unit (A), the structural unit (B), the structural unit (C), the structural unit (D), the structural unit (E), and the structural unit (F), $R^5$ represents a hydrogen atom or a methyl group, $R^6$ represents an alkyl group, an alkenyl group, or an alkynyl group, m represents an integer of 0 to 5, n represents an integer of 0 to 11, and $L^5$ represents a divalent group which is one selected from the third group consisting of an alkylene group having 1 to 18 carbon atoms, an arylene group having 6 to 18 carbon atoms, —O—, —NH—, —S—, and —C(═O)—, a divalent group which is obtained by combining two or more selected from the third group, or a single bond.

2. The pretreatment liquid according to claim 1, wherein the resin has at least one selected from the group consisting of the structural unit (A) and the structural unit (B).

3. The pretreatment liquid according to claim 1, wherein a total content of the structural unit (1), the structural unit (2), and the structural unit (3) is in a range of 5% by mass to 80% by mass with respect to an entirety of the resin.

4. The pretreatment liquid according to claim 1, wherein a total content of the structural unit (1), the structural unit (2), and the structural unit (3) is in a range of 10% by mass to 60% by mass with respect to an entirety of the resin.

5. The pretreatment liquid according to claim 1, wherein the resin has at least one selected from the group consisting of the structural unit (1) and the structural unit (2).

6. The pretreatment liquid according to claim 1, wherein the glass transition temperature of the resin is in a range of −20° C. to 90° C.

7. The pretreatment liquid according to claim 1, wherein the glass transition temperature of the resin is in a range of −10° C. to 60° C.

8. The pretreatment liquid according to claim 1, wherein the resin further has a structural unit (4), (4)

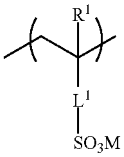

in the structural unit (4), $R^1$ represents a methyl group or a hydrogen atom, $L^1$ represents a divalent group which is one selected from the fourth group consisting of an alkylene group having 1 to 10 carbon atoms, an arylene group having 6 to 10 carbon atoms, —O—, —NH—, —S—, —C(═O)—, and —CH(—OH)—, a divalent group which is obtained by combining two or more selected from the fourth group, or a single bond, and M represents a hydrogen atom or a cation.

9. The pretreatment liquid according to claim 1, wherein a content of a structural unit derived from an alkyl (meth)acrylate containing a chain alkyl group having 2 or more carbon atoms in the resin is less than 5% by mass with respect to an entirety of the resin.

10. The pretreatment liquid according to claim 1, wherein a distance between Hansen solubility parameters of the resin and the aqueous medium is in a range of 33 $MPa^{1/2}$ to 40 $MPa^{1/2}$.

11. The pretreatment liquid according to claim 1, wherein a content mass ratio of the resin to the aggregating agent is in a range of 1.0 to 10.

12. The pretreatment liquid according to claim 1, wherein a distance between Hansen solubility parameters of the resin and the aggregating agent is in a range of 5 $MPa^{1/2}$ to 28 $MPa^{1/2}$.

13. An ink set used for recording an image on an impermeable base material, comprising:

the pretreatment liquid according to claim 1; and an ink containing water and a colorant.

14. A base material for image recording, comprising:

an impermeable base material; and a pretreatment layer which is disposed on at least one surface of the impermeable base material and contains a solid content of the pretreatment liquid according to claim 1.

15. A method of producing a base material for image recording, comprising:

applying the pretreatment liquid according to claim 1 onto an impermeable base material.

16. An image recording material comprising:

an impermeable base material; and an image which is disposed on at least one surface of the impermeable base material and contains a solid content of the pretreatment liquid according to claim 1 and a colorant.

17. An image recording method comprising:

applying the pretreatment liquid according to claim 1 onto an impermeable base material; and applying an ink containing water and a colorant onto a surface of the impermeable base material onto which the pretreatment liquid has been applied to record an image.

* * * * *